US012526095B2

(12) United States Patent
Pitaval et al.

(10) Patent No.: US 12,526,095 B2
(45) Date of Patent: Jan. 13, 2026

(54) TRANSMITTER AND RECEIVER FOR WIRELESS COMMUNICATIONS BASED ON MULTIDIMENSIONAL CODEBOOKS, AND METHODS OF OPERATING THE SAME

(71) Applicant: Huawei Technologies Co., Ltd., Shenzhen (CN)

(72) Inventors: Renaud-Alexandre Pitaval, Kista (SE); Yi Qin, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 408 days.

(21) Appl. No.: 17/835,116

(22) Filed: Jun. 8, 2022

(65) Prior Publication Data

US 2022/0303075 A1 Sep. 22, 2022

Related U.S. Application Data

(63) Continuation of application No. PCT/EP2019/084179, filed on Dec. 9, 2019.

(51) Int. Cl.
*H04L 5/00* (2006.01)
*H04L 1/00* (2006.01)
*H04L 27/26* (2006.01)

(52) U.S. Cl.
CPC ............ *H04L 5/0016* (2013.01); *H04L 1/004* (2013.01); *H04L 5/0044* (2013.01); *H04L 27/2601* (2013.01)

(58) Field of Classification Search
None
See application file for complete search history.

(56) References Cited

U.S. PATENT DOCUMENTS 10,374,765 B2   8/2019  Manolakos et al.
11,032,033 B2   6/2021  Lee et al.
(Continued)

FOREIGN PATENT DOCUMENTS

CN   102932309 A   2/2013
CN   109983726 A   7/2019
(Continued)

OTHER PUBLICATIONS

Ashikhmin, A. et al., "Grassmannian Packing from Operator Reed-Muller Codes," IEEE Transactions on Information Theory, vol. 56, No. 11, Nov. 2010, 26 pages.
(Continued)

*Primary Examiner* — Peter Chen
(74) *Attorney, Agent, or Firm* — Slater Matsil, LLP

(57) ABSTRACT

A wireless transmitter, receiver and a method of wireless communication, the method including obtaining prime factors for a number $N_{RE}$ of time-frequency resources, including at least two different prime factors, generating a codebook comprising at least one codeword, each of the at least one codeword being generated by multiplying at least one mask sequence with one vector of an orthogonal set of vectors, and each mask sequence of the at least one mask sequence being obtained from an exponentiation operation involving a base and an exponent, the base being defined by the at least two different prime factors, and the exponent being defined by a quadratic polynomial having a number of m variables, where m is equal to a total number of the prime factors constituting $N_{RE}$, and providing, to a receiver, information bits in at least one of the at least one codeword over the $N_{RE}$ time-frequency resources.

16 Claims, 17 Drawing Sheets

(56) References Cited

U.S. PATENT DOCUMENTS

| | | |
|---|---|---|
| 2011/0126067 A1 | 5/2011 | Rezk et al. |
| 2018/0324767 A1 | 11/2018 | Manolakos et al. |
| 2019/0260418 A1 | 8/2019 | Park et al. |
| 2020/0106574 A1 | 4/2020 | Lee et al. |

FOREIGN PATENT DOCUMENTS

| | | | | |
|---|---|---|---|---|
| WO | 2016070829 A1 | 5/2016 | | |
| WO | 2018203818 A1 | 11/2018 | | |
| WO | WO-2018203996 A1 | * 11/2018 | ........... | H04L 5/0042 |
| WO | 2018236078 A1 | 12/2018 | | |

OTHER PUBLICATIONS

Boztas, S. et al., "4-Phase Sequences with Near-Optimum Correlation Properties," IEEE Transactions on Information Theory, vol. 38, No. 3, May 1992, 13 pages.

Calderbank, R. et al., "Construction of a Large Class of Deterministic Sensing Matrices that Satisfy a Statistical Isometry Property," IEEE Journal of Selected Topics in Signal Processing, vol. 4, No. 2, Apr. 2010, 17 pages.

Delsarte, P. et al., "Alternating Bilinear Forms over GF(q)," Journal of Combinatorial Theory (A), vol. 19, Issue 1, Jul. 1975, 25 pages.

Durisi, G. et al., "Short-Packet Communications Over Multiple-Antenna Rayleigh-Fading Channels," IEEE Transactions on Communications, vol. 64, No. 2, Feb. 2016, 12 pages.

Heath, Jr., R.W., "On Quasi-Orthogonal Signatures for CDMA Systems," IEEE Transactions on Information Theory, vol. 52, No. 3, Mar. 2003, 10 pages.

Hochwald, B.M. et al., "Unitary Space-Time Modulation for Multiple-Antenna Communications in Rayleigh Flat Fading," IEEE Transactions on Information Theory, vol. 46, No. 2, Mar. 2000, 22 pages.

Hochwald, B.M. et al., "Systematic Design of Unitary Space-Time Constellations," IEEE Transactions on Information Theory, vol. 46, No. 6, Sep. 2000, 12 pages.

Inoue, T. et al., "Kerdock Codes for Limited Feedback Precoded MIMO Systems," IEEE Transactions on Signal Processing, vol. 57, No. 9, Sep. 2009, 6 pages.

Kumar, P.V. et al., "An Upper Bound for Some Exponential Sums Over Galois Rings and Applications," Proceedings of 1994 IEEE International Symposium on Information Theory, Aug. 6, 2002, 1 page.

Kumar, P.V. et al., "Large Families of Quaternary Sequences with Low Correlation," IEEE Transactions on Information Theory, vol. 42, No. 2, Mar. 1996, 14 pages.

Marzetta, T.L. et al., "Capacity of a Mobile Multiple-Antenna Communication Link in Rayleigh Flat Fading," IEEE Transactions on Information Theory, vol. 45, No. 1, Jan. 1999, 19 pages.

Pitaval, R.A. et al., "Low Complexity MIMO Precoding Codebooks from Orthoplex Packings," Proceedings of IEEE International Conference on Communications, ICC 2011, Kyoto, Japan, Jun. 5-9, 2011, 6 pages.

Popovic, B.M., "Quasi-Orthogonal Supersets," 2011 IEEE Information Theory Workshop, 2011, 5 pages.

Wootters, W.K. et al., "Optimal State-Determination by Mutually Unbiased Measurements," Anals of Physics, vol. 191, Issue 2, May 1, 1989, 19 pages.

Zheng, L. et al., "Communidation on the Grassman Manifold: A Geometric Approach to the Nonchoherent Multiple-Antenna Channel," IEEE Transactions on Information Theory, vol. 48, No. 2, Feb. 2002, 25 pages.

"Impact of Codebook Size and Weight Update Delays on System Level CL Tx Diversity Performance with RAKE receiver and ISD of 2800 m," Source: Renesas Electronics Europe, Agenda Item: 5.2.1.1, Document for: Discussion, 3GPP TSG-RAN WG1 Meeting #64, R1-110827, Taipei, Taiwan, Feb. 21-25, 2011, 13 pages.

* cited by examiner

TRANSMITTER AND RECEIVER FOR WIRELESS COMMUNICATIONS BASED ON MULTIDIMENSIONAL CODEBOOKS, AND METHODS OF OPERATING THE SAME

CROSS-REFERENCE TO RELATED APPLICATIONS

This application is a continuation of International Application No. PCT/EP2019/084179, filed on Dec. 9, 2019, the disclosure of which is hereby incorporated by reference in its entirety.

TECHNICAL FIELD

The present disclosure relates generally to the field of wireless communications and, in particular, to techniques based on multidimensional codebooks, e.g. for supporting pilotless transmission of information bits from a transmitter to a receiver.

BACKGROUND

In current communication technologies, such as the 3rd Generation Partnership Project (3GPP) Long Term Evolution (LTE) and the 5th generation (5G) New Radio (NR), information-bearing symbols are demodulated at a receiver based on a channel estimation acquired via training signals. In practice, the channel estimation is obtained by using pilot symbols, such as a Demodulation Reference Signal (DM-RS), that are known to the receiver. As a rule, the pilot symbols are time- and/or frequency-division multiplexed with the information-bearing symbols, meaning that the pilot symbols and the information-bearing symbols are transmitted on different time slots and/or frequency bands. Therefore, specific time and frequency resources need to be reserved for the pilot symbols in the vicinity of the resources for the information-bearing symbols, so that the precise channel estimation could be provided. However, if a communication channel changes too rapidly in time and/or frequency, compared to the periodicity of pilot transmission, such training of the receiver can become much more resource-intensive. On the other hand, a large channel-estimation error can adversely affect the quality of the demodulation of the information-bearing symbols.

Furthermore, the 5G NR technology will enable new use scenarios which are infeasible in the $4^{th}$ generation (4G) technology, such, for example, as Ultra-Reliable Low-Latency Communication (URLLC) applications and/or machine type communications (MCT). Depending on particular application, the MCT may require only sporadic short-packet transmission, sometimes with ultra-reliability and low latency. In such context, the practical cost of acquiring the channel estimation at the receiver becomes more predominant and must not be neglected. Unavoidable rate losses caused by the resource-intensive training based on the channel estimation and/or by the imperfect acquisition of the channel estimation become more significant for such short-packet transmissions.

SUMMARY

This summary is provided to introduce a selection of concepts in a simplified form that are further described below in the detailed description. This summary is not intended to identify key features or essential features of the present disclosure, nor is it intended to be used to limit the scope of the present disclosure.

It is an object of the present disclosure to provide a technical solution that enables pilotless transmission of information bits from a transmitter to a receiver by using a codebook, e.g. in the form of a multidimensional codebook generated in advance at both the transmitter and the receiver.

The object above is achieved by the features of the independent claims in the appended claims. Further embodiments and examples are apparent from the dependent claims, the detailed description and the accompanying drawings.

According to a first aspect, a transmitter for wireless communications is provided. The transmitter is configured to obtain prime factors for a number $N_{RE}$ of time-frequency resources such that at least two of the prime factors are different. The transmitter is further configured to generate a codebook comprising at least one codeword. The codebook is to be understood as a multidimensional codebook for this first aspect and also in the disclosure of embodiments of the invention. Each of the at least one codeword is generated by multiplying at least one mask sequence with one of an orthogonal set of vectors. Each of the at least one mask sequence is obtained by using an exponentiation operation involving a base and an exponent, with the base being defined by the at least two different prime factors and the exponent being defined by a quadratic polynomial having a number m of variables, where m is equal to a total number of the prime factors constituting $N_{RE}$. The transmitter is further configured to provide, to a receiver, information bits in at least one of the at least one codeword over the $N_{RE}$ time-frequency resources. By so doing, it is possible to provide the pilotless transmission of the information bits in at least one codeword from the transmitter to the receiver. Moreover, this embodiment of the transmitter may provide a high-performance codebook that is accommodated for any number $N_{RE}$ of time-frequency resources.

In one embodiment of the first aspect, the orthogonal set of vectors is configured as a generalized Hadamard matrix comprising elements that are defined by the prime factors constituting the number $N_{RE}$ of the time-frequency resources. This may allow one to obtain an orthogonal structure of the codebook itself that is relevant for rate adaptation and generalization to a multi-antenna system.

In one embodiment of the first aspect, the base is defined as a q-th root of unity, where q is a product of the at least two different prime factors, and the quadratic polynomial is a quadratic form defined by using an m×m symmetric matrix S. By constructing the mask sequence this way, one may generate the codebook of any size, with entries of each codeword being defined by a Phase-Shift Keying (PSK) alphabet.

In one embodiment of the first aspect, the symmetric matrix S comprises diagonal elements represented by integers modulo q or integers modulo q divided by 2, and off-diagonal elements represented by integers modulo q divided by 2. This embodiment may allow one to maximize a minimum chordal distance between the codewords constituting the codebook, thereby increasing the efficiency of decoding the codewords at the receiver.

In one other embodiment of the first aspect, the symmetric matrix S comprises a main diagonal constituted by blocks. Each block has a size corresponding to an order of respective one of the prime factors constituting $N_{RE}$, and comprises elements each being (i) the product of an integer modulo said prime factor and q divided by said prime factor if said prime factor is odd, or (ii) the product of an integer modulo said prime factor and q divided by the product of 2 and said prime factor if said prime factor is two. At the same time, the symmetric matrix S comprises off-diagonal-block elements set to zero or to integer multiples of one of the prime factors constituting $N_{RE}$. This embodiment may allow one to maximize the minimum chordal distance between the codewords constituting the codebook, thereby increasing the efficiency of decoding the codewords at the receiver.

In one more other embodiment of the first aspect, the symmetric matrix S comprises a main diagonal constituted by a first block and a second block. The first block comprises a binary matrix selected from a Delsarte-Goethals (DG) set of binary matrices, and the second block comprises a ternary number that is fixed or associated with the first block. This embodiment may allow one to maximize the minimum chordal distance between the codewords constituting the codebook, thereby increasing the efficiency of decoding the codewords at the receiver.

In one embodiment of the first aspect, the symmetric matrix S for the quadratic polynomial of each of the at least one mask sequence is selected such that a rank of a difference between the equally-indexed diagonal blocks of any two symmetric matrices S is as large as possible. This embodiment may allow one to maximize the minimum chordal distance between the codewords constituting the codebook, thereby increasing the efficiency of decoding the codewords at the receiver.

In one embodiment of the first aspect, the transmitter is further configured to generate control information comprising the number $N_{RE}$ of the time-frequency resources and a number $N_{CB}$ of the codewords in the generated codebook, and provide, to the receiver, the control information prior to said providing the information bits. By so doing, one may make the transmitter according to the first aspect more flexible in use.

According to a second aspect, a receiver for wireless communications is provided. The receiver is configured to receive control information comprising a number $N_{RE}$ of time-frequency resources and a number $N_{CB}$ of codewords in a codebook to be generated. The receiver is further configured to find prime factors for $N_{RE}$ such that at least two of the prime factors are different. The receiver is further configured to generate the codebook comprising the $N_{CB}$ codewords. Each codeword is generated by multiplying at least one mask sequence with one of an orthogonal set of vectors. Each of the at least one mask sequence is obtained by using an exponentiation operation involving a base and an exponent, with the base being defined by the at least two different prime factors and the exponent being defined by a quadratic polynomial having a number m of variables, where m is equal to a total number of the prime factors constituting $N_{RE}$. The receiver is further configured to receive at least one transmitted codeword having information bits encoded therein, and retrieve the information bits by calculating chordal distances between the at least one transmitted codeword and each of the $N_{CB}$ codewords. By so doing, it is possible to provide pilotless transmission of the information bits in at least one codeword from the transmitter to the receiver. Moreover, this embodiment of the receiver may provide a high-performance codebook that is accommodated for any number $N_{RE}$ of time-frequency resources used by the transmitter for the pilotless transmission of the information bits.

In one embodiment of the second aspect, the orthogonal set of vectors is configured as a generalized Hadamard matrix comprising elements that are defined by the prime factors constituting the number $N_{RE}$ of the time-frequency resources. This may allow one to obtain an orthogonal structure of the codebook that is relevant for rate adaptation and generalization to a multi-antenna system.

In one embodiment of the second aspect, the base is defined as a q-th root of unity, where q is a product of the at least two different prime factors, and the quadratic polynomial is a quadratic form defined by using an m×m symmetric matrix S. By constructing the mask sequence this way, one may generate the codebook of any size.

In one embodiment of the second aspect, the symmetric matrix S comprises diagonal elements represented by integers modulo q or integers modulo q divided by 2, and off-diagonal elements represented by integers modulo q divided by 2. This embodiment may allow one to maximize a minimum chordal distance between the codewords constituting the codebook, thereby increasing the efficiency of decoding the codewords at the receiver.

In one other embodiment of the second aspect, the symmetric matrix S comprises a main diagonal constituted by blocks. Each block has a size corresponding to an order of respective one of the prime factors constituting $N_{RE}$, and comprises elements each being (i) the product of an integer modulo said prime factor and q divided by said prime factor if said prime factor is odd, or (ii) the product of an integer modulo said prime factor and q divided by the product of 2 and said prime factor if said prime factor is two. At the same time, the symmetric matrix S comprises off-diagonal-block elements set to zero or to integer multiples of one of the prime factors constituting $N_{RE}$. This embodiment may allow one to maximize the minimum chordal distance between the codewords constituting the codebook, thereby increasing the efficiency of decoding the codewords at the receiver.

In one more other embodiment of the second aspect, the symmetric matrix S comprises a main diagonal constituted by a first block and a second block. The first block comprises a binary matrix selected from a Delsarte-Goethals (DG) set of binary matrices, and the second block comprises a ternary number that is fixed or associated with the first block. This embodiment may allow one to maximize the minimum chordal distance between the codewords constituting the codebook, thereby increasing the efficiency of decoding the codewords at the receiver.

In one embodiment of the second aspect, the symmetric matrix S for the quadratic polynomial of each of the at least one mask sequence is selected such that a rank of a difference between the equally-indexed diagonal blocks of any two symmetric matrices S is as large as possible. This embodiment may allow one to maximize the minimum chordal distance between the codewords constituting the codebook, thereby increasing the efficiency of decoding the codewords at the receiver.

According to a third aspect, a method for wireless communication is provided. The method comprises the step of finding prime factors for a number $N_{RE}$ of time-frequency resources such that at least two of the prime factors are different. The method further comprises the step of generating a codebook comprising at least one codeword. Each of the at least one codeword is generated by multiplying at least one mask sequence with one of an orthogonal set of vectors. Each of the at least one mask sequence is obtained by using an exponentiation operation involving a base and an exponent, with the base being defined by the at least two different prime factors, and the exponent being defined by a quadratic polynomial having a number of m variables, where m is equal to a total number of the prime factors constituting $N_{RE}$. The method further comprises the step of providing, to a receiver, information bits in at least one of the at least one codeword over the $N_{RE}$ time-frequency resources. By so doing, it is possible to provide pilotless transmission of the information bits in at least one codeword from the transmitter to the receiver. Moreover, in this embodiment of the method, a high-performance codebook may be provided, which is accommodated for any number $N_{RE}$ of time-frequency resources used for the pilotless transmission of the information bits.

According to a fourth aspect, a method for wireless communication is provided. The method comprises the step of receiving control information comprising a number $N_{RE}$ of time-frequency resources and a number $N_{CB}$ of codewords in a codebook to be generated. The method further comprises the step of finding prime factors for $N_{RE}$ such that at least two of the prime factors are different. The method further comprises the step of generating the codebook comprising $N_{CB}$ codewords. Each codeword is generated by multiplying at least one mask sequence with one of an orthogonal set of vectors. Each of the at least one mask sequence is obtained by using an exponentiation operation involving a base and an exponent, with the base being defined by the at least two different prime factors, and the exponent being defined by a quadratic polynomial having a number m of variables, where m is equal to a total number of the prime factors constituting $N_{RE}$. The method further comprises the steps of receiving at least one transmitted codeword having information bits encoded therein, and retrieving the information bits by calculating chordal distances between the at least one transmitted codeword and each of the $N_{CB}$ codewords. By so doing, it is possible to provide pilotless transmission of the information bits in at least one codeword from the transmitter to the receiver. Moreover, in this embodiment of the method, a high-performance codebook may be provided, which is accommodated for any number $N_{RE}$ of time-frequency resources used by the pilotless transmission of the information bits.

Other features and advantages of the present disclosure will be apparent upon reading the following detailed description and reviewing the accompanying drawings.

BRIEF DESCRIPTION OF THE DRAWINGS

The essence of the present disclosure is explained below with reference to the accompanying drawings in which.

DETAILED DESCRIPTION OF ILLUSTRATIVE EMBODIMENTS

Figure 1:
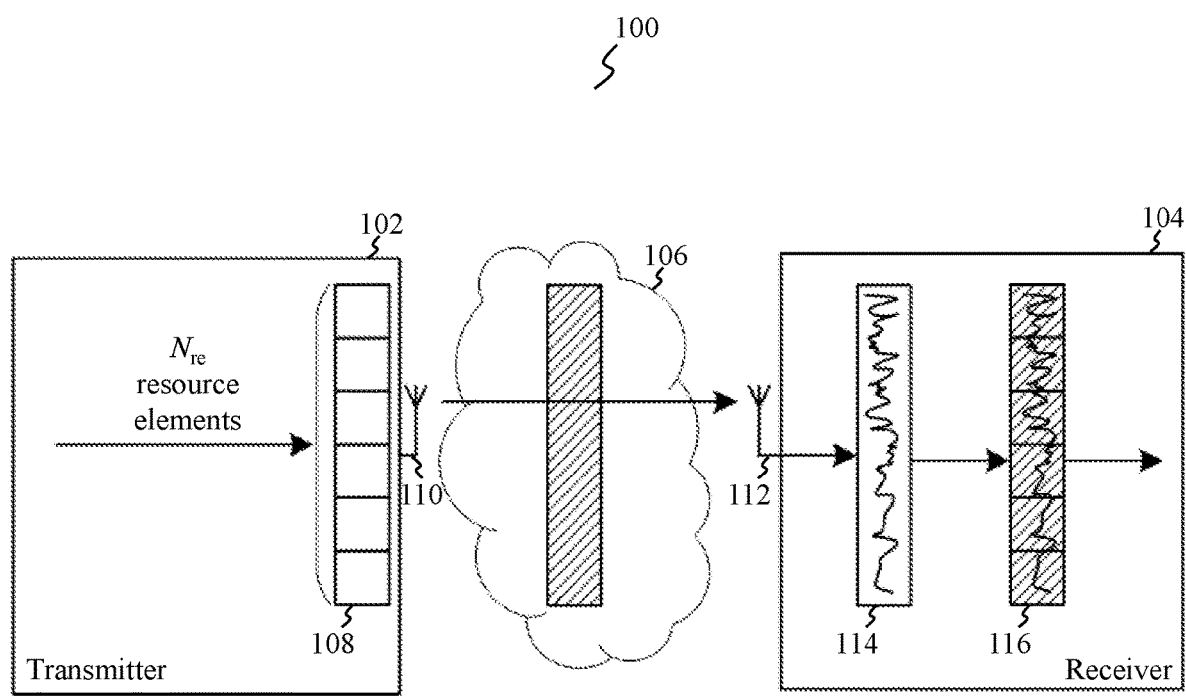
FIG. 1 shows a general block-scheme of a wireless communication system deployed within a geographic area of interest.

Various embodiments of the present disclosure are further described in more detail with reference to the accompanying drawings. However, the present disclosure can be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatuses and methods disclosed herein can be implemented in practice by using any numbers of the embodiments provided herein. Furthermore, it should be understood that any embodiment of the present disclosure can be implemented using one or more of the elements presented in the appended claims.

The word "exemplary" or example is used herein in the meaning of "used as an illustration". Unless otherwise stated, any embodiment described herein as "exemplary" or an example should not be construed as preferable or having an advantage over other embodiments.

In some embodiments described herein, each of a transmitter and a receiver may refer to an individual device or be part of a complex device. In other embodiments described herein, one of the transmitter and the receiver may refer to an individual device, while another of the transmitter and the receiver may be part of a complex device. Such a complex device may be implemented, for example, as a user equipment (UE) or a base station (BS).

The UE may refer to a mobile device, a mobile station, a terminal, a subscriber unit, a mobile phone, a cellular phone, a smart phone, a cordless phone, a personal digital assistant (PDA), a wireless communication device, a laptop computer, a tablet computer, a gaming device, a netbook, a smartbook, an ultrabook, a medical device or medical equipment, a biometric sensor, a wearable device (for example, a smart watch, smart glasses, a smart wrist band), an entertainment device (for example, an audio player, a video player, etc.), a vehicular component or sensor, a smart meter/sensor, industrial manufacturing equipment, a global positioning system (GPS) device, an Internet-of-Things (IoT) device, a machine-type communication (MTC) device, a group of Massive IoT (MIoT) or Massive MTC (mMTC) devices/sensors, or any other suitable device configured to support wireless communications.

The BS may relate to a fixed point of communication for the UEs in a particular carrier network. The BS may be referred to as a base transceiver station (BTS) in terms of the 2G communication technology, a NodeB in terms of the 3G communication technology, an evolved NodeB (eNodeB) in terms of the 4G communication technology, and a gNB in terms of the 5G NR communication technology. The BS may be implemented as a basic service set (BSS) representing a set of all base stations communicating with each other, or an extended service set (ESS) representing a set of connected BSSs. The BS may serve different cells, such as a macrocell, a microcell, a picocell, a femtocell, and/or other types of cells. The macrocell may cover a relatively large geographic area (for example, at least several kilometers in radius). The microcell may cover a geographic area less than two kilometers in radius, for example. The picocell may cover a relatively small geographic area, such, for example, as offices, shopping malls, train stations, stock exchanges, etc. The femtocell may cover an even smaller geographic area (for example, a home). Correspondingly, the BS serving the macrocell may be referred to as a macro BS, the BS serving the microcell may be referred to as a micro BS, and so on.

FIG. 1 shows a general block-scheme of a wireless communication system 100 deployed within a geographic area of interest, such, for example, as any of the above-mentioned macrocell, microcell, picocell, and femtocell. The communication system 100 comprises a transmitter 102, a receiver 104, and a communication channel 106 via which the transmitter 102 and the receiver 104 may communicate with each other. The transmitter 102 may be part of any of the above-mentioned types of the UEs, while the receiver 104 may be part of any of the above-mentioned types of the BSs, or vice versa. Let us now assume that the transmitter 102 needs to transmit a multidimensional symbol 108 of length $N_{RE}$ towards the receiver 104. To perform such transmission, the transmitter 102 should use $N_{RE}$ time-frequency resources, also known as resource elements (REs), which are available at the moment. As a rule, the REs are grouped into Physical Resource Blocks (PRBs). Each PRB consists of 12 subcarriers. In time, the REs are grouped into slots, where each slot are constituted by 7 or 14 REs. When the $N_{RE}$ REs are allocated, the transmitter 102 modulates certain subcarriers with the multidimensional symbol 108, thereby generating a modulated signal. The transmitter 102 comprises a transmitting antenna 110 configured to transmit the modulated signal to the receiver 104. In turn, the receiver 104 comprises a receiving antenna 112 configured to receive the modulated signal. Since it is impossible to make the communication channel 106 absolutely noiseless and to provide error-free signal demodulation at the receiver 104, the modulated signal received at the receiver 104 may be conditionally presented as a received signal 114 in the form:

$$y = sh + \text{noise}$$

where y is the received signal 114, s is the multidimensional symbol 108, h is the channel coefficient that is a scalar. The channel coefficient h is constant over the PRB constituted by $N_{RE}$ REs but can change from PRB to PRB.

If pilotless transmission is used in the communication system 100, the channel coefficient h is then unknown, neither at the transmitter 102 nor the receiver 104. For this reason, the transmitter 102 cannot try to adapt to and compensate for channel distortion peculiar to the communication channel 106. As a result, the receiver 104 cannot detect if the received signal 114 is purely s or any other signal 116 of the form $\alpha s$, $\alpha$ being any complex number that has been transmitted, as $\alpha$ cannot be separated from the channel distortion.

One possible way to resolve the above-mentioned problem consists in using multidimensional codebooks each representing a collection of codewords. Such a multidimensional codebook can achieve a higher transmission rate than pilot-based transmission. The multidimensional codebook and its constituents-codewords may also be referred to as a multidimensional constellation and constellation points, respectively, in the art. In general, the multidimensional codebook may be considered as a look-up table providing the mapping between input data, such as information bits or the multidimensional symbol 108, and certain one or more codewords. It should also be noted that the multidimensional codebook may be mentioned further as a codebook, just for the sake of convenience and simplicity; but whenever the codebook is used, one should understand that it is exactly the multidimensional codebook or constellation.

There is a plethora of known multidimensional codebooks that could be used for the pilotless transmission. Such codebooks may be classified in the following two groups depending on construction methods: computer search and analytical designs. The codebooks constructed based on the computer-search method often do not have a specific structure that may be relevant for practical purposes. Moreover, the computer-search method itself is limited by computer capabilities, i.e. its application to generating large codebooks in size and/or in dimensionality becomes prohibitively complex. The codebooks constructed based on the analytical designs have a typical drawback to be provided for very limited scenarios either in size or dimensionality. The analytical designs are very often based on the Galois field (GF) theory, and thus derived for dimensions which are prime-powers or functions of a prime-power, which is not well adapted to the 5G NR technology.

At the same time, the analytical designs of specific interest are related to the Kerdock, Delsarte-Goethals, and second-order Reed-Muller codes in powers-of-two dimensions. The codebook constituted by any of these codes is a collection of orthogonal sets of codewords, where each set is constructed from a Hadamard matrix multiplied by a cover or mask sequence. The orthogonal and nested structure of such a codebook is relevant for rate adaptation and generalization to multi-antenna system.

Let us now recall how the multidimensional codebooks may be constructed based on the Kerdock, Delsarte-Goethals, and second-order Reed-Muller codes in powers-of-two dimensions. Assuming that the number $N_{RE}$ of the available (allocated) REs is equal to $N_{RE} = 2^m$, with the order $m \geq 1$. The multidimensional codebook is constructed from an orthogonal set of vectors which are all a covered version of the Hadamard matrix. Each orthogonal set of vectors is an $2^m \times 2^m$ unitary matrix whose rows and columns are indexed by m-binary vectors. For example, with m=3, the rows and columns are indexed with an element in the Galois field GF(8), i.e. with intergers 0 to $(2^3-1)=7$ represented by the following binary mapping (where the superscript T is the transpose sign):

$0 \rightarrow (0, 0, 0)^T$
$1 \rightarrow (0, 0, 1)^T$
$2 \rightarrow (0, 1, 0)^T$
$3 \rightarrow (0, 1, 1)^T$
$4 \rightarrow (1, 0, 0)^T$
$5 \rightarrow (1, 0, 1)^T$
$6 \rightarrow (1, 1, 0)^T$
$7 \rightarrow (1, 1, 1)^T$.

More specifically, each codebook is a set of column vectors $\{c_{S,k}\}$ whose elements are defined by $$[c_{S,k}]_l = \frac{1}{\sqrt{N_{RE}}} i^{l^T S l + 2 k^T l},$$

where $GF(2^m)$ is the Galois field defined by $2^m$, $l \in GF(2^m)$ is the binary vector indexing the rows, $k \in GF(2^m)$ and $S$ are the binary vector and symmetric matrix, respectively, indexing the columns.

Given $S$ and $k$ thus defined, the vector $[l^T S l + 2 k^T l]_l$ is a codeword in the second-order quaternary Reed-Muller code. By rewriting it as $$[c_{S,k}]_l = \frac{1}{\sqrt{N_{re}}} i^{l^T S l} \times (-1)^{k^T l}$$

and omitting the constant $$\frac{1}{\sqrt{N_{RE}}}$$

which is just a normalization applied to the codewords, one may see that the codewords are constructed by an element-wise product of the Hadamard matrix $[(-1)^{k^T l}]_{k,l}$ and the mask sequence $[i^{l^T S l}]_l$. The mask sequence is obtained by using an exponentiation operation, with the quadratic form $l^T S l$ being an exponent and the 4-th root of unity being a base.

Figure 2:
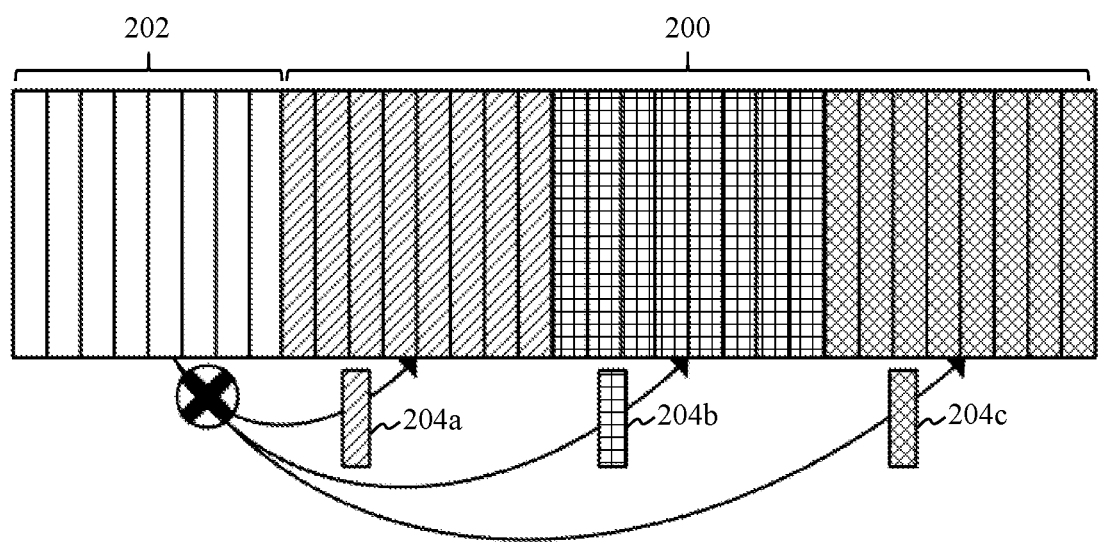
FIG. 2 shows a general scheme for the construction of a multidimensional codebook based on the second-order Reed-Muller codes.

FIG. 2 shows a general scheme for the construction of a multidimensional codebook 200 based on the second-order Reed-Muller codes, as described above. More specifically, each codeword of the codebook 200, which is represented by a properly-shaded column, is an element-wise product of one of columns of an Hadamard matrix 202 and one of mask sequences 204a, 204b, 204c. The number of the mask sequences and the number of the columns of the Hadamard matrix 202 are given only as an example and may change if required.

As shown in FIG. 2, the codewords of the codebook 200 may be obtained by using the different mask sequences 204a, 204b, 204c. In turn, each of the mask sequences 204a, 204b, 204c is characterized by its own symmetric matrix. The correlation between two codewords $c_{S,k}$ and $c_{S',k'}$ constructed from two different symmetric matrices $S$ and $S'$ is given by $$|\theta(c_{S,k}, c_{S',k'})| = |c_{S,k}^H c_{S',k'}| = 2^{-R/2},$$

where the superscript $H$ indicates the complex conjugate transpose, and $R = \text{rank}[(S-S') \mod 2]$ is the rank of the difference between the symmetric matrices $S$ and $S'$. An equivalent chordal distance $d_c$ between the codewords $c_{S,k}$ and $c_{S',k'}$ is thus $$d_c^2(c_{S,k}, c_{S',k'}) = 1 - |\theta(c_{S,k}, c_{S',k'})|^2 = 1 - 2^{-R}.$$

It should be noted that the chordal distance $d_c$ is used to measure the maximum likelihood decoding rule and pairwise-error rate on the receiving side, i.e. at the receiver 104. A good codebook design is obtained by maximizing the chordal distance $d_c$.

There is a maximum of $2^{m(m+1)/2}$ possible binary symmetric matrices $S$. This full set of binary matrices can be constructed as a nested subspace $\mathcal{S}_m$ of symmetric matrices, known as the Delsarte-Goethals (DG) sets, $$K_m = DG(m, 0) \subset DG(m, 1) \ldots \subset DG\left(m, \left\lceil \frac{m-1}{2} \right\rceil\right) = \mathcal{S}_m.$$

For any $$r \leq \left\lfloor \frac{m-1}{2} \right\rfloor,$$

$DG(m,r)$ is a $(r+1)m$-dimentional binary subspace leading to a collection of $2^{(r+1)m}$ symmetric matrices such that any non-zero matrix in the set $DG(m,r)$ has a rank at least equal to $R = m - 2r$. The first set $K_m = DG(m, 0)$ is called the Kerdock set such that, at a given $S \in DG(m, 0)$, the vector $[l^T S l + 2 k^T l]_l$ is a codeword in the quaternary Kerdock code. The Kerdock set is a subspace of full-rank binary matrices.

The codebook construction described above relies on using almost all possible quadratic polynomials defined over the ring of integers modulo 4 with the binary multidimensional variable $l$. Some quadratic polynomials are not considered in this codebook construction but can be used to increase a codebook size, as described below.

For example, let us consider the case $m=2$, so that $l = [l_1, l_2]^T$, $k = [k_1, k_2]^T$ and $$S = \begin{bmatrix} s_{11} & s_{12} \\ s_{12} & s_{22} \end{bmatrix}.$$

By expansion and observing that $x^2 = x$ for a binary variable (precisely $0^2 = 0$ and $1^2 = 1$) we have $$l^T S l + 2 k^T l = 2 s_{12} l_1 l_2 + (2 k_1 + s_{11}) l_1 + (2 k_2 + s_{22}) l_2.$$

Hence, with binary symmetric matrices, we are able to list all possible coefficients modulo 4 for the first-degree terms of the quadratic polynomial, while the coefficient of the second-degree term of the quadratic polynomial can only be 0 or 2. This results in a codebook with 32 codewords and the chordal distance $$d_c = \frac{1}{\sqrt{2}} \approx 0.71.$$

By considering also $s_{12} = \frac{1}{2}$ and $3/2$, we are able to construct other possible quadratic polynomials, which extend the codebook to 64 codewords with the chordal distance $d_c = \sqrt{3/8} \approx 0.61$.

The observation above may extend to any $m$, where larger codebooks are obtained by considering symmetric matrices with binary diagonal elements but off-diagonal elements equal to 0, ½, 1 or 3/2. Let the extended DG set containing all these matrices be denoted by $\mathcal{S}_m^+$, which is of size $2^{m^2}$. This means that the maximum codebook size may be increased from $2^{m/2(m+3)}$ to $2^{m(m+1)}$.

Figure 3:
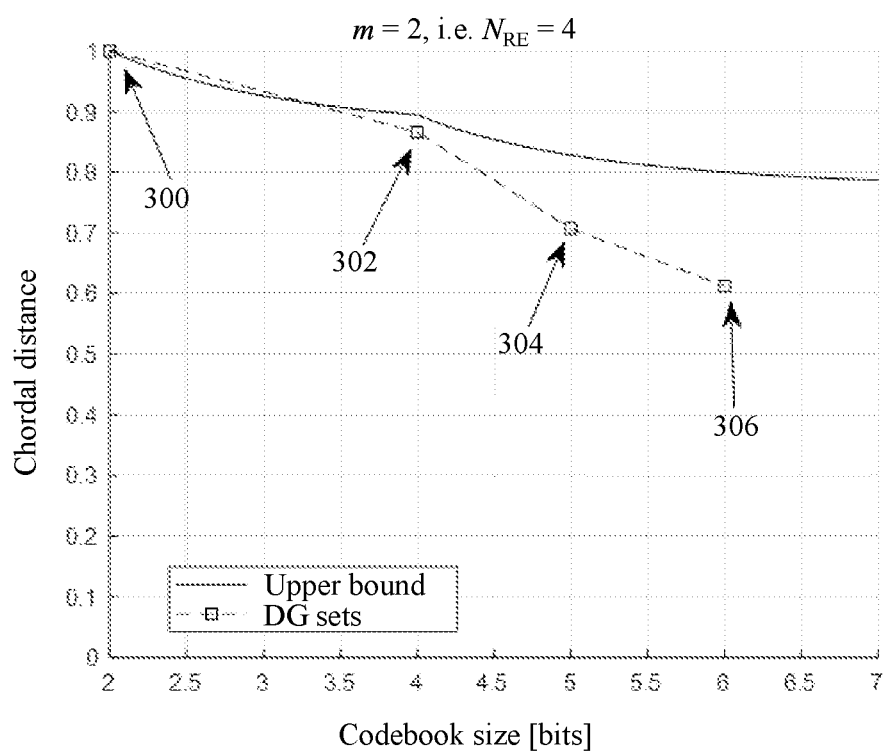
FIGS. 3 and 4 shows show dependences of a chordal distance d_c on a codebook size for different number $N_{RE}$ of resource elements.
Figure 4:
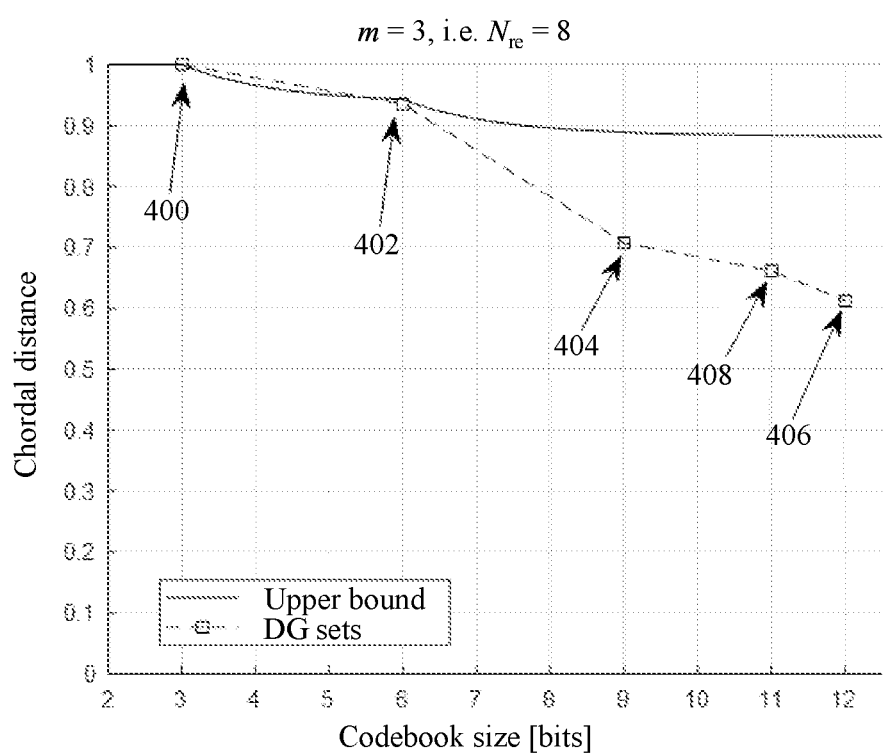

FIGS. 3 and 4 show dependences of the chordal distance $d_c$ on the codebook size for the cases with $m=2$ (which corresponds to $N_{RE}=4$) and $m=3$ (which corresponds to $N_{RE}=8$), respectively. The upper bound shown is a composite bound which is the minimum of the simplex/Welch, Levenshtein, and Hamming bounds. In FIGS. 3 and 4, there are points 300, 400 which correspond to the codebook constructed based on the orthogonal Hadamard matrix only, points 302, 402 which correspond to the codebook constructed based on the Kerdock codes ($K_2$=DG(2,0) and $K_3$=DG(3,0), respectively), points 304, 404 which correspond to the codebook constructed based on the DG codes (DG(2,1)=$S_2$ and DG(3,1)=$S_3$, respectively), and points 306, 406 which correspond to the codebook constructed based on the extended DG sets ($\mathcal{S}_2^+$ and $\mathcal{S}_3^+$, respectively). In the case with m=2, the codebook size increases from 2 bits to 6 bits, where the chordal distance $d_c=\sqrt{3/8}\approx 0.61$. In the case with m=3, the codebook size increases from 3 bits to 12 bits, where the chordal distance $d_c=\sqrt{3/8}\approx 0.61$. In FIG. 4, there is also a point 408 corresponding to an intermediate codebook with the size of 11 bits and the chordal distance $d_c=\sqrt{7}/4\approx 0.66$, which is obtained by limiting the three off-diagonal elements of the symmetric matrix S such that always two of them are either ½ or 3/2, and the remaining one is either 0 or 1.

However, the above-described constructions of the multidimensional codebooks based on the Kerdock, DG, and second-order Reed-Muller codes are limited to power-of-a-prime dimensions. Other prior art construction methods, such as those based on Zadoff-Chu (ZC) sequences, are limited to using single-variable quadratic polynomials to obtain the mask sequences. All of this do not provide a satisfactory codebook size and correlation properties (i.e. proper chordal distances between the codewords) in case of using the non-prime number of the REs.

The exemplary embodiments disclosed herein provide a technical solution that allows mitigating or even eliminating the above-sounded drawbacks peculiar to the prior art. In particular, the technical solution disclosed herein allows constructing families of multidimensional codebooks for non-prime power dimensions in order for them to be able to accommodate to any possible RE allocation. Briefly speaking, each codeword of the multidimensional codebook is generated by multiplying at least one mask sequence with one of an orthogonal set of vectors. Each of the at least one mask sequence is obtained by using the exponentiation operation, which may be mathematically expressed as $b^e$, where b and e are the base and exponent, respectively, of the exponentiation operation. The technical solution relies on the base b defined by at least two different prime factors of a given number $N_{RE}$ of the REs and the exponent e defined by a quadratic polynomial having a number m of variables, where m is equal to a total number of the prime factors constituting $N_{RE}$. The resulting multidimensional codebooks are characterized by the large minimum chordal distance $d_c$, which guarantees good performance. Moreover, the technical solution disclosed herein allows generating a family of nested codebooks, which is desirable for rate adaptation. On top of that, the resulting multidimensional codebooks can potentially be exploited to define quasi-Gray bit mapping, simpler decoding and log-likelihood computation.

The above-mentioned prime factors are derived from the prime factorization or prime decomposition of the number $N_{RE}$ of the REs. As used herein, the prime factorization of a given number, such as $N_{RE}$, may refer to determining a set of prime factors whose product gives the number itself. The prime factors themselves are prime numbers (i.e. those numbers which can be divided by themselves and 1 only). In the context of the prime factorization, the word "different" or "unique" means the prime factors which do not repeat each other. For example, the prime factorization of 12 looks as follows: 12=2×2×3, where 2 and 3 are different or unique prime factors.

Figure 5:
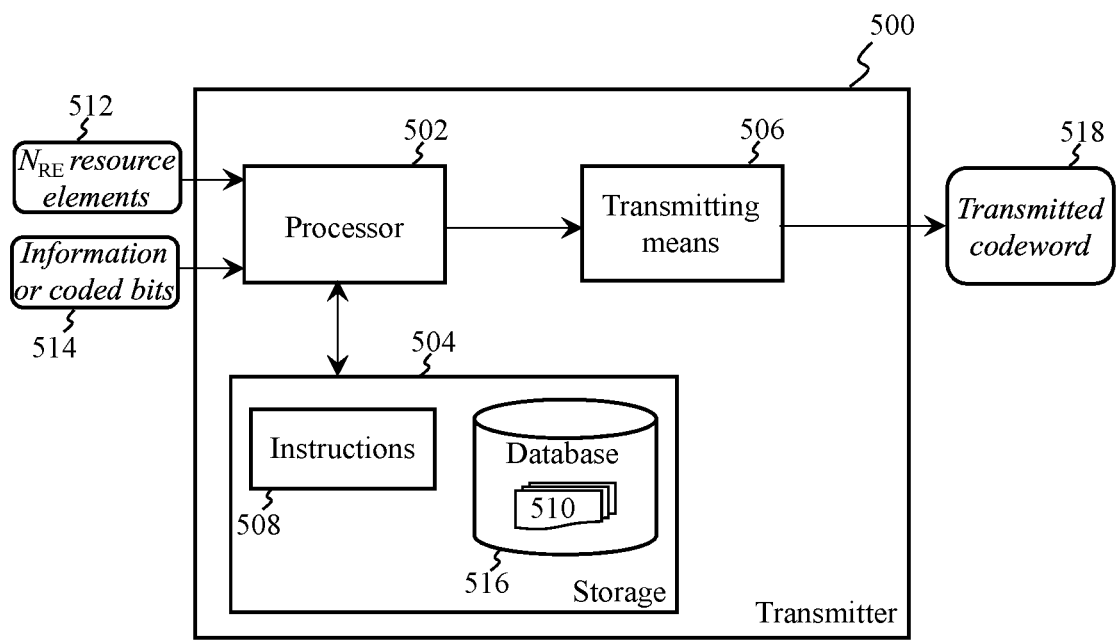
FIG. 5 shows a block-scheme of a transmitter capable of performing pilotless transmission in accordance with one example.

FIG. 5 shows a block-scheme of a transmitter 500 capable of performing the pilotless transmission in accordance with one exemplary embodiment. As noted earlier, the transmitter 500 may be either an individual device or part of the UE or the BS. As shown in FIG. 5, the transmitter 500 comprises at least the following constructive elements: a processor 502, a storage 504, and a transmitting means 506. The storage 504 is coupled to the processor 502 and stores processor-executable instructions 508 which, when executed by the processor 502, cause the processor 502 to generate a multidimensional codebook 510 based on a number 512 $N_{RE}$ of the REs and use the multidimensional codebook 510 in the pilotless transmission of information (or coded) bits 514. The storage 504 further comprises a database 516 configured to store the multidimensional codebook 510 once generated. It should be noted that the number, arrangement and interconnection of the constructive elements constituting the transmitter 500, which are shown in FIG. 5, are not intended to be any limitation of the present disclosure, but merely used to provide a general idea of how the constructive elements may be implemented within the transmitter 500. In one other exemplary embodiment, the transmitter 500 may further comprise at least one receiver configured to receive the number 512 $N_{RE}$ of the REs and the information (or coded) bits 514 and provide them, as inputs, to the processor 502 for further processing. It is also implied that the transmitting means 506 is configured to perform different operations required to perform the pilotless transmission of the information bits 514 in at least one codeword 518 of the codebook 510, including the modulation of certain subcarrier(s) with the at least one codeword 518.

The processor 502 may be implemented as a central processing unit (CPU), general-purpose processor, single-purpose processor, microcontroller, microprocessor, application specific integrated circuit (ASIC), field programmable gate array (FPGA), digital signal processor (DSP), complex programmable logic device, etc. It should be also noted that the processor 502 may be implemented as any combination of one or more of the aforesaid. As an example, the processor may be a combination of two or more microprocessors.

The storage 504 may be implemented as a nonvolatile or volatile memory used in the modern electronic computing machines. As an example, the nonvolatile memory may include Read-Only Memory (ROM), ferroelectric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The processor-executable instructions 508 stored in the storage 504 may be configured as a computer executable code which causes the processor 502 to perform the aspects of the present disclosure. The computer executable code for carrying out operations or steps for the aspects of the present disclosure may be written in any combination of one or more programming languages, such as Java, C++, or the like. In some examples, the computer executable code may be in the form of a high level language or in a pre-compiled form, and be generated by an interpreter (also pre-stored in the storage 504) on the fly.

Figure 6:
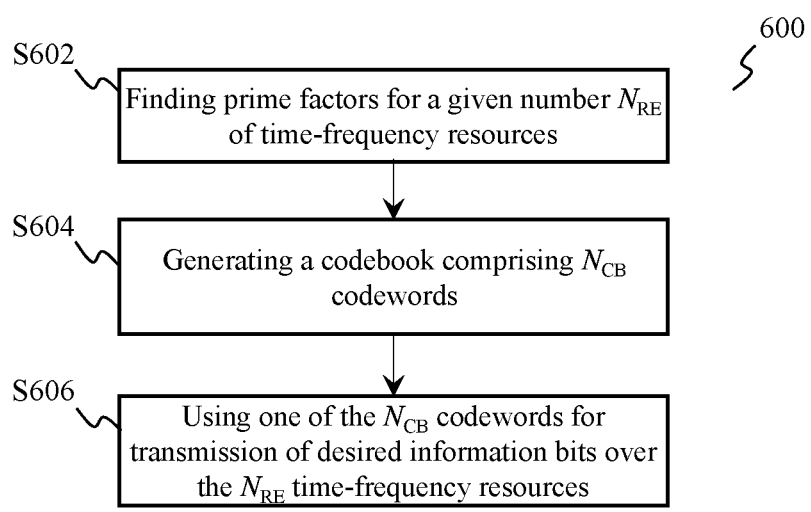
FIG. 6 shows a flowchart of a method for operating the transmitter shown in FIG. 5 in accordance with one example.

FIG. 6 shows a flowchart of a method 600 for operating the transmitter 500 in accordance with one exemplary embodiment. Each of the steps of the method 600 is performed by corresponding one of the above-described constructive elements constituting the transmitter 500. The method 600 starts with a step S602, in which the processor 502 finds prime factors for the number 512 $N_{RE}$ of the REs. Such prime factorization should be performed such that two or more prime factors are different, which may be written as follows:

$$N_{RE}=p_1^{m_1}p_2^{m_2}\ldots p_n^{m_n},$$

where $p_1<\ldots<p_n$ are the n different prime factors, each of the order $m_1,\ldots, m_n$. There is a total of $m=\Sigma_{k=1}^{n} m_k$ prime factors (including the repeating ones) constituting $N_{RE}$.

Further, the method 600 proceeds to a step S604, in which the processor 502 generates the codebook 510 comprising $N_{CB}$ codewords. Each of the $N_{CB}$ codewords is generated by multiplying at least one mask sequence with one of an orthogonal set of vectors, like it was done above with reference to FIG. 2. At the same time, the difference is that each of the at least one mask sequence is obtained by using the exponentiation operation, in which the base is defined by the n different prime factors and the exponent is defined by a quadratic polynomial having a number m of variables (i.e. the number of variables in the quadratic polynomial is equal to the total number of the prime factors constituting $N_{RE}$).

In the embodiments disclosed herein, the orthogonal set of vectors may refer to any subset of vectors $(v_1,\ldots, v_k)$ in a vector space V, which is such that a scalar product of any two different vectors of the subset is equal to zero, i.e. $\langle v_i, v_j\rangle=0$ at $i\neq j$. That is, the vectors of the subset are mutually perpendicular. The type or pattern of such an orthogonal set of vectors may be pre-defined in the transmitter 500, i.e. the processor 502 may be pre-configured to use a certain type of the orthogonal set of vectors in the step S604. One non-limiting example of such a type of the orthogonal set of vectors is a generalized Hadamard matrix, and the processor 502 may either construct it or use its pre-stored (in the storage 504) pattern in the step S604.

After that, the method 600 ends up with a step S606, in which the transmitting means 506 performs the pilotless transmission of the information bits 514 in at least one codeword 518 over the $N_{RE}$ REs. It should be noted that the at least one codeword 518 to be used for the pilotless transmission of the information bits 514 may be selected by the processor 502 based on any known mapping techniques, such as bits-to-codeword mapping or look-up tables, for which reason their description is omitted therein.

Figure 7:
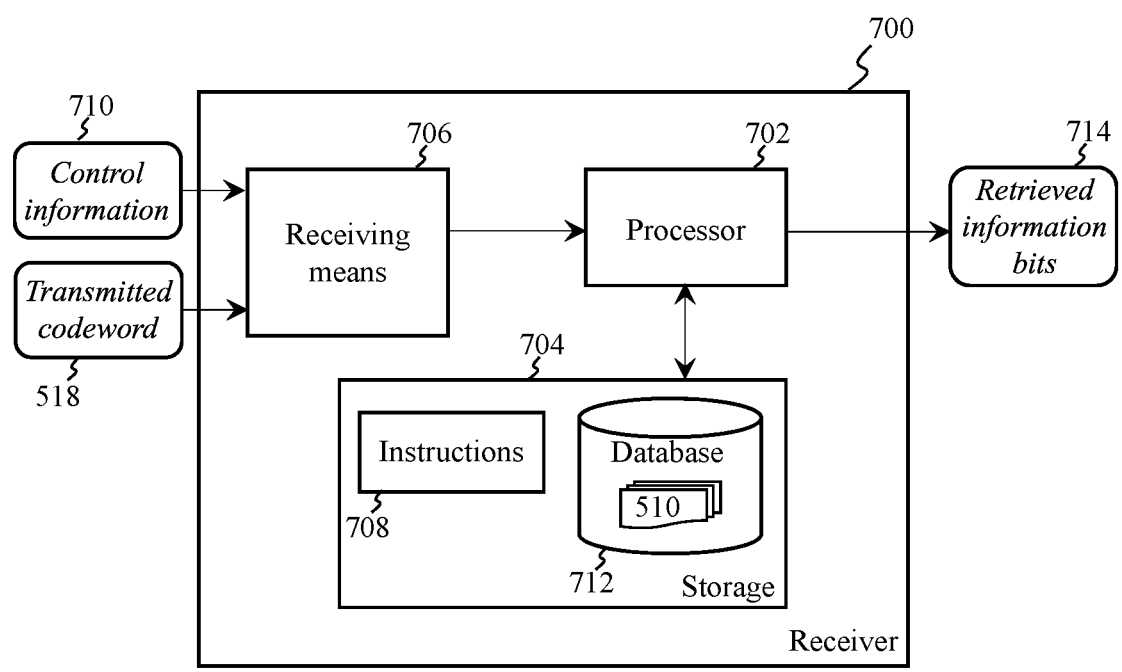
FIG. 7 shows a block-scheme of a receiver capable of receiving and processing at least one codeword from the transmitter shown in FIG. 5 in accordance with one example.

FIG. 7 shows a block-scheme of a receiver 700 capable of receiving and processing the at least one transmitted codeword 518 from the transmitter 500 in accordance with one exemplary embodiment. Similarly, the receiver 700 may be either an individual device or part of the UE or the BS. As shown in FIG. 7, the receiver 700 comprises at least the following constructive elements: a processor 702, a storage 704, and a receiving means 706. The storage 704 is coupled to the processor 702 and stores processor-executable instructions 708 which, when executed by the processor 702, cause the processor 702 to generate the same multidimensional codebook 510 as the processor 502 of the transmitter 500, and use the multidimensional codebook 510 to retrieve the information bits 514 from the at least one transmitted codeword 518. To generate the multidimensional codebook 510, the receiver 700 needs to know the number 512 $N_{RE}$ of the REs and the number $N_{CB}$ of the codewords in the codebook 510 to be generated. These parameters may be combined into control information 710. In one embodiment, the control information 710 may be communicated directly by the transmitter 500 to the receiver 700 prior to performing the step S506. In one other embodiment, the receiver 700 may be pre-configured to store the control information 710 in the storage 704, i.e. before the initiation of its interaction with the transmitter 500. In one more other embodiment, the transmitter 500 may configured to provide the control information 710 to any intermediate device that, in turn, is configured to communicate the control information 710 to the receiver 700 before the initiation of its interaction with the transmitter 500. The storage 704 further comprises a database 712 configured to store the multidimensional codebook 510 once generated. Again, the number, arrangement and intercommunication of the constructive elements constituting the receiver 700, which are shown in FIG. 7, are not intended to be any limitation of the present disclosure, but merely used to provide a general idea of how the constructive elements may be implemented within the receiver 700.

It should also be noted that each of the processor 702, the storage 704 and the processor-executable instructions 708 may be implemented in the same or similar manner as corresponding one of the processor 502, the storage 504 and the processor-executable instructions 508 of the transmitter 500 shown in FIG. 5. As for the receiving means 706, it is implied to be configured to perform different operations required to perform the receipt of the at least one transmitted codeword 518 of the codebook 510, including the demodulation of certain subcarrier(s) carrying the at least one transmitted codeword 518.

Figure 8:
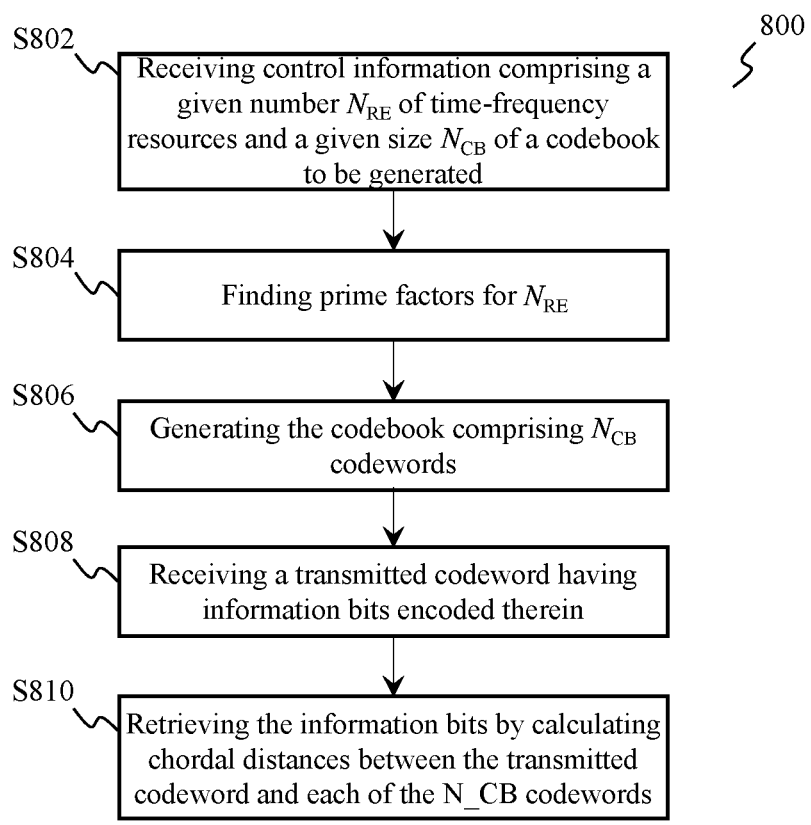
FIG. 8 shows a flowchart of a method for operating the receiver shown in FIG. 7 in accordance with one example.

FIG. 8 shows a flowchart of a method 800 for operating the receiver 700 in accordance with one exemplary embodiment. Each of the steps of the method 800 is performed by corresponding one of the above-described constructive elements constituting the receiver 700. The method 800 starts with a step S802, in which the receiving means 706 receives the control information 710 comprising the number 512 $N_{RE}$ of the REs and the number $N_{CB}$ of codewords in the codebook 510 to be generated. As noted above, the control information 710 may be communicated to the receiving means 706 of the receiver 700 directly from the transmitting means 506 of the transmitter 500 or any other intermediate device, or the storage 704 of the receiver 700 may be pre-configured to store the control information 710 before the initiation of the interaction between the transmitter 500 and the receiver 700. In the latter case, the receiving means 706 may be used only to receive the at least one transmitted codeword 518. Anyway, the control information 710 should then be provided to the processor 702 for further processing.

More specifically, in a step S804, the processor 702 proceeds to find the prime factors for $N_{RE}$ such that at least two of the prime factors are different. Then, in a step S806, the processor 702 generates the codebook 510 comprising the $N_{CB}$ codewords in the same or similar manner as it is done by the processor 502 in the step S504 of the method 500. Similarly, the type or pattern of the orthogonal set of vectors may be pre-defined in the receiver 700, i.e. the processor 702 may be pre-configured to use a certain type of the orthogonal set of vectors, such, for example, as the generalized Hadamard matrix, in the step S806. Moreover, in one embodiment, both the transmitter 500 and the receiver 700 may further be pre-configured to use the same type or pattern of the base and the exponent in the exponentiation operation. By so doing, the control information 710 may be represented by the above-mentioned parameters $N_{RE}$ and $N_{CB}$ only. In another (more resource-intensive) embodiment, the type or pattern of the base and the exponent may also be transmitted to the receiver 700, i.e. the processor 702, in the control information 710.

After that, the method 800 proceeds to a step S808, in which the receiving means 706 further receives the at least one transmitted codeword 518 from the transmitter 500 and provides it to the processor 702. The method 800 ends up with a step S810, in which the processor 702 retrieves the information bits 514 by calculating the chordal distances $d_c$ between the at least one transmitted codeword 518 and each of the $N_{CB}$ codewords. The chordal distances $d_c$ may be used to compute likelihood values to be used in a decoder which may be further included in the receiver 700.

The performance of the codebook 510 generated in each of the steps S604 and S806 of the methods 600 and 800, respectively, is characterized by its pairwise distance distribution, i.e. any codebook with the same chordal distance distribution can be considered equivalent. It is worth noticing that, according to the above-given definition of the chordal distance $d_c$, any phase rotation of the codewords, or any unitary rotation of the whole codebook leads to an equivalent codebook. That is, a codebook $\{c_1, c_2, \ldots, c_{N_{CB}}\}$ is equivalent to any codebook of the form $$\{e^{i\phi_1}c_1, e^{i\phi_2}c_2, \ldots, e^{i\phi_{N_{CB}}}c_{N_{CB}}\},$$

for an arbitrary set of phases $\{\phi_1, \phi_2, \ldots, \phi_{N_{CB}}\}$. Additionally, the codebook $\{c_1, c_2, \ldots, c_{N_{CB}}\}$ is equivalent to any codebook of the form $\{Uc_1, Uc_2, \ldots, Uc_{N_{CB}}\}$ where U is the arbitrary $N_{RE} \times N_{RE}$ unitary matrix.

Figure 9:
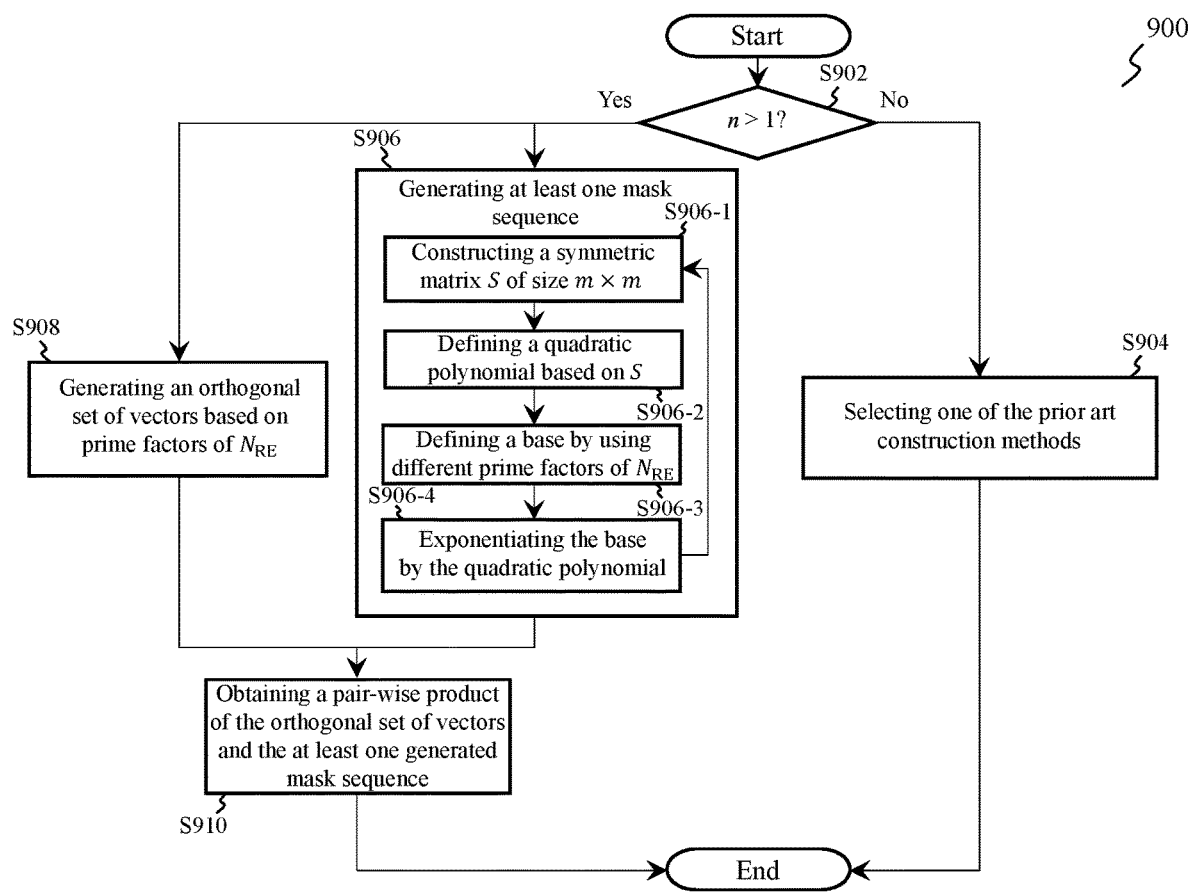
FIG. 9 shows a flowchart explaining how to generate a codebook used in the methods shown in FIGS. 6 and 8 in accordance with one example.
Figure 10:
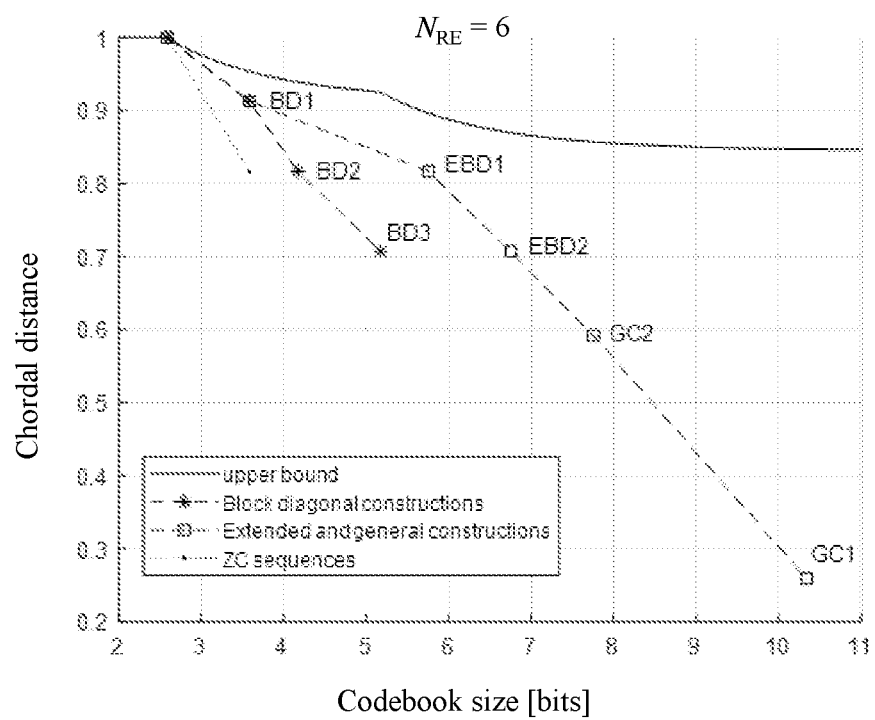
FIGS. 10-14 show the minimum chordal distance d_c as a function of the codebook size for different $N_{RE}$=6, 12, 14, 15, and 24.
Figure 11:
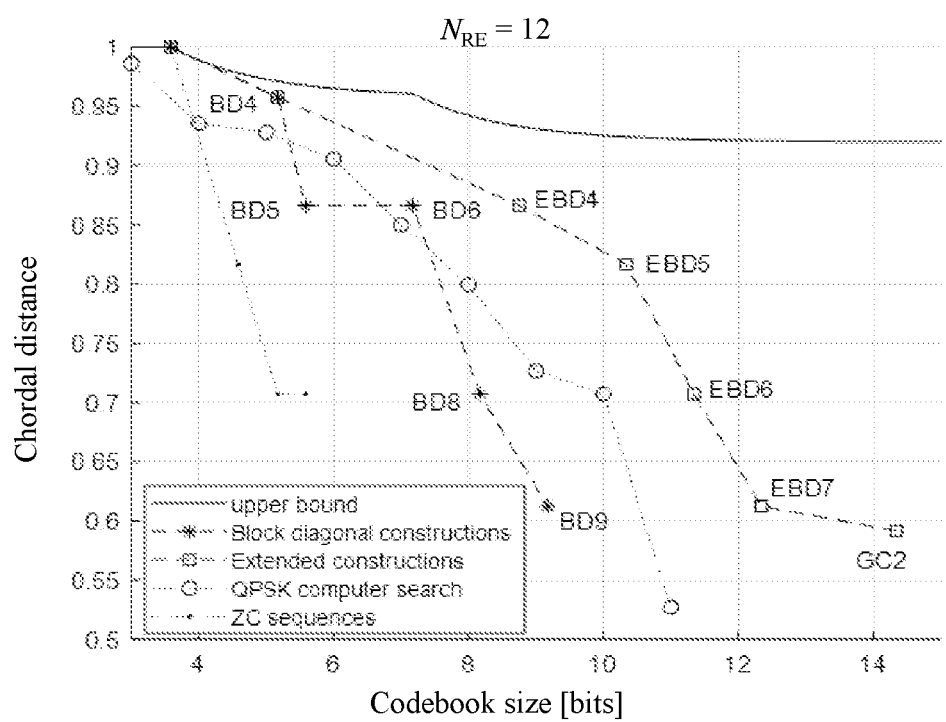
Figure 12:
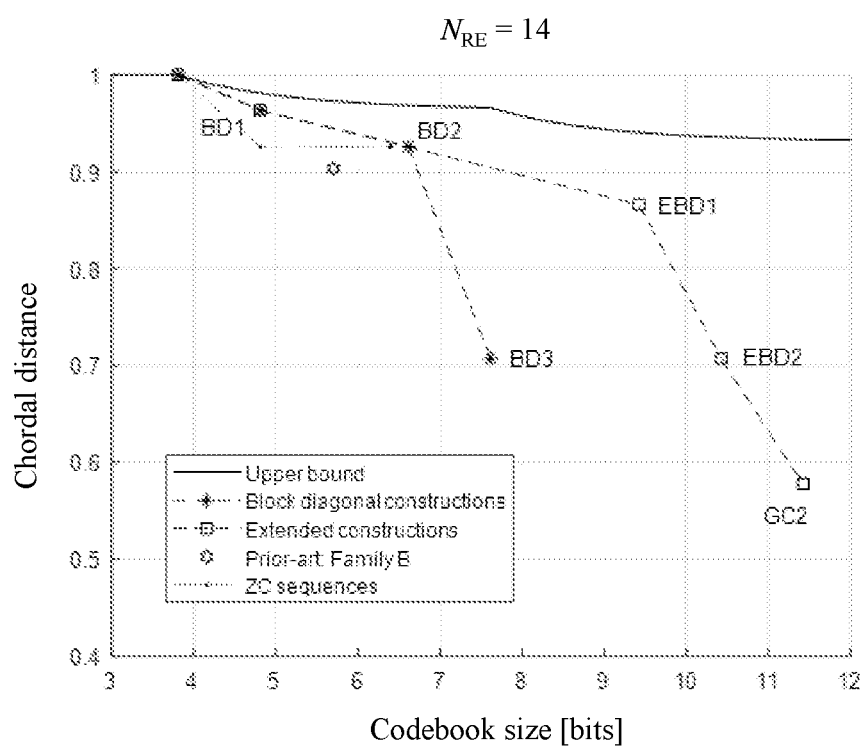
Figure 13:
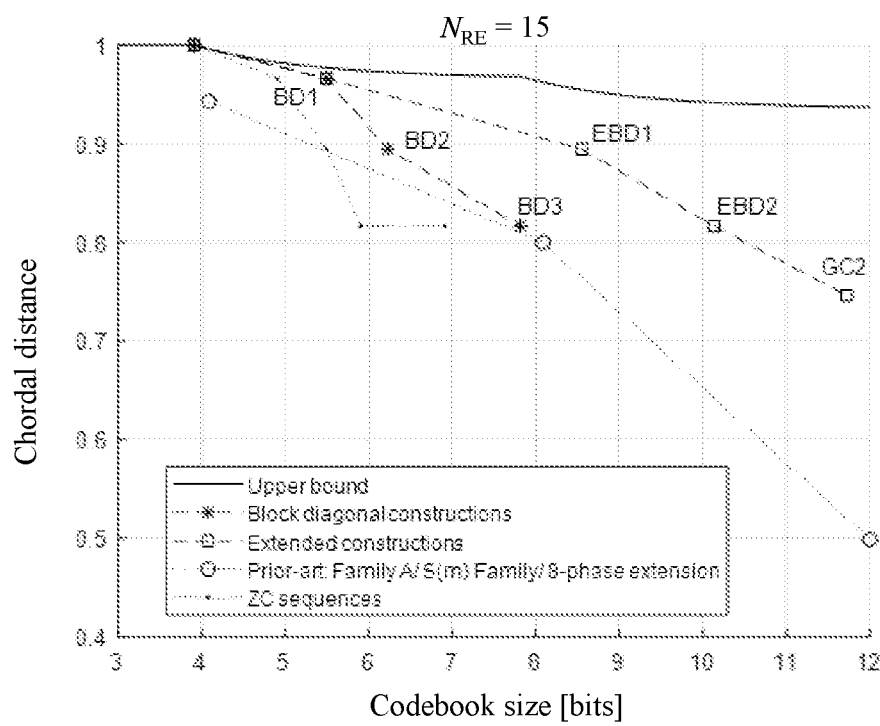
Figure 14:
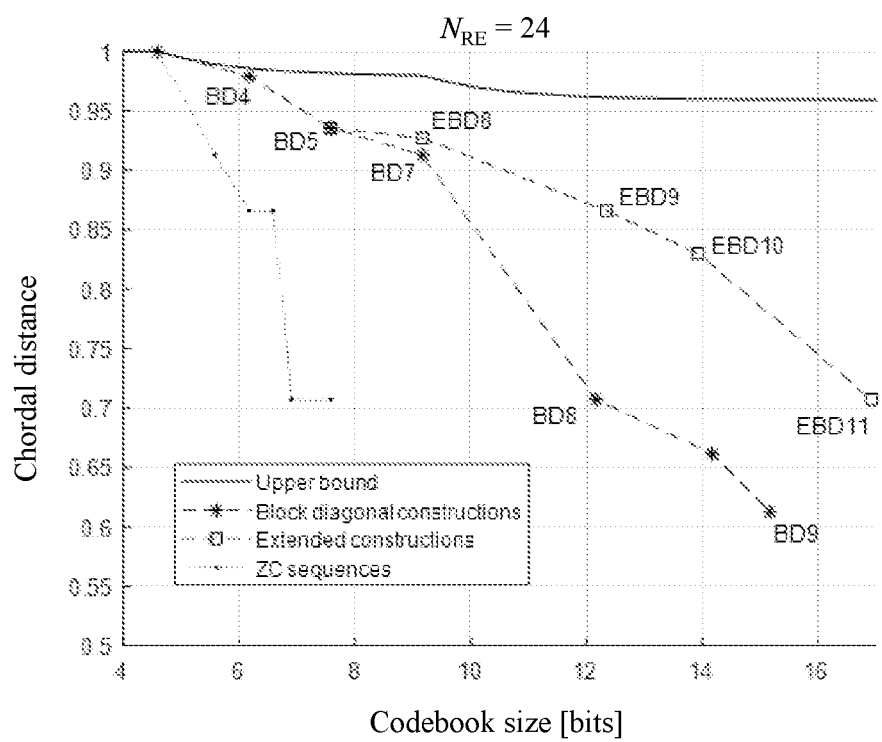

FIG. 9 shows a flowchart 900 of how each of the steps S604 and S806 in the methods 600 and 800, respectively, may be implemented in accordance with one exemplary embodiment. Correspondingly, each step included in the flowchart 900 may be executed by each of the processors 502 and 702. The flowchart 900 starts with a step S902, in which it is determined whether the condition n>1 is met. In other words, the step S902 is aimed at determining whether there is more than 1 different prime factor in the prime factorization of $N_{RE}$. If the result of such determination is "No", the flowchart 900 goes to the right branch represented by a step S904. Once the step S904 is initiated, one of the prior art construction methods, such, for example, as those based on the Kerdock, DG, second-order Reed-Muller codes or the Zadoff-Chu sequences, may be selected to construct a certain codebook. After that, the flowchart 900 is terminated. However, if "Yes" is provided in the step S902, the flowchart 900 goes to the left branch represented by steps S906-910, which are all aimed at generating the codebook 510. Each of the steps S906-S910 will now be described in more detail.

More specifically, the step S906 is executed to generate at least one mask sequence and comprises several substeps S906-1-S906-4. In the substep S906-1, a symmetric matrix S of size m×m is constructed, which may be performed by using one of the following three possible ways 1.) Diagonal elements of the symmetric matrix S may be set to integers modulo q or integers modulo q divided by 2, where $q=\Pi_{k=1}^{n} p_k$ is the product of the different prime factors in the prime factorization of $N_{RE}$. In turn, off-diagonal elements of the symmetric matrix S may be set to integers modulo q divided by 2.

2.) The symmetric matrix S may be implemented as a block diagonal matrix. As used herein, the block diagonal matrix may refer to a block matrix that is a square matrix such that blocks on its main diagonal are square matrices too. In this embodiment, each block has a size corresponding to the order of respective one of the prime factors constituting $N_{RE}$, and comprise elements each being (i) the product of an integer modulo said prime factor and q divided by said prime factor if said prime factor is odd, or (ii) the product of an integer modulo said prime factor and q divided by the product of 2 and said prime factor if said prime factor is two. As for the off-diagonal-block elements of the symmetric matrix S, they may be set to zero or integer multiples of one of the prime factors constituting $N_{RE}$.

Let us give one example of this embodiment. Assuming that $N_{RE} = 36 = 2^2 \times 3^2$ and $$S = \begin{pmatrix} S_1 & 0 \\ 0 & S_2 \end{pmatrix}.$$

Then, the first block $S_1$ is a square matrix of size $m_1 \times m_1 = 2 \times 2$, and the second block $S_2$ is a square matrix of the same size $m_2 \times m_2 = 2 \times 2$. Moreover, since the first prime is 2, the first block $S_1$ comprises elements each represented by the product of an integer modulo 2 and 3/2 (which is obtained as follows: $q/(2 \times 2) = (3 \times 2)/(2 \times 2) = 3/2$). The second prime is odd, i.e. 3, for which reason the second block $S_2$ comprises elements each represented by the product of an integer modulo 3 and 2 (which is obtained as follows: $q/3 = (3 \times 2)/3 = 2$).

3.) The symmetric matrix S may comprise a main diagonal constituted by a first block and a second block. The first block may comprise a binary matrix selected from the DG set of binary matrices, while the second block may comprise a ternary number that is fixed or associated with the first block.

Once the symmetric matrix S is constructed (for example, by using any of the three embodiments given above), substep S906-2 is initiated, in which a quadratic polynomial $P(x_1, x_2, \ldots, x_m)$ in m variables is defined based on the symmetric matrix S. As used herein, the quadratic polynomial $P(x_1, x_2, \ldots, x_m)$ may refer to a polynomial function with m variables, in which the highest-degree term is of the second order or degree. In general, the quadratic polynomial $P(x_1, x_2, \ldots, x_m)$ may be written as follows:

$$P(x_1, x_2, \ldots, x_m) = \Sigma_{i,j=1}^{m} a_{ij} x_i x_j + \Sigma_{i=1}^{m} b_i x_i + c,$$

where $a_{ij}$ are the coefficients of a symmetric m-dimensional matrix, $b_i$ are the coefficients of an m-dimensional vector, and c is the constant. The symmetric matrix S defines all coefficients of the second-order terms in the quadratic polynomial $P(x_1, x_2, \ldots, x_m)$. In other words, $$S = \begin{bmatrix} a_{11} & \ldots & a_{1m} \\ \ldots & \ldots & \ldots \\ a_{m1} & \ldots & a_{mm} \end{bmatrix}.$$

In a preferred embodiment, the quadratic polynomial $P(x_1, x_2, \ldots, x_m)$ is given as a quadratic form $Q(x_1, x_2, \ldots, x_m)$, in which all terms are of the second degree, i.e.

$$Q(x_1, x_2, \ldots, x_m) = \Sigma_{i,j=1}^{m} a_{ij} x_i x_j.$$

Further, a next substep S906-3 is executed, in which the base used in the exponentiation operation is defined based on the different prime factors of $N_{RE}$. In a preferred embodiment, the base may be defined as follows:

$$W = \sqrt[q]{1}, \quad q = \prod_{k=1}^{n} p_k,$$

where W is the base, and $\sqrt[q]{1}$ is the q-th root of unity in the field of complex numbers. In some embodiments, the base W may be represented by some random roots of unity. In particular, a small scaling of the root of unity in the base W is also possible, say, in the interval [0.5, 2]. In other embodiments, the base W may be represented by different trigonometric functions such that $$W = \cos\left(\frac{2\pi}{q}\right), \text{ or, } W = \cos\left(\frac{2\pi j}{q}\right)$$

(where j is the imaginary unit), $$W = \sin\left(\frac{2\pi}{q}\right),$$

etc., or any combinations of such trigonometric functions.

When the quadratic polynomial $P(x_1, x_2, \ldots, x_m)$ and the base W are defined, a next substep S906-4 is initiated, in which the base W is exponentiated by the quadratic polynomial $P(x_1, x_2, \ldots, x_m)$, i.e. $W^{P(x_1, x_2, \ldots, x_m)}$, thereby generating the mask sequence. After that, the substeps S906-1-S906-4 are repeated until all mask sequences are generated. In one embodiment, only one mask sequence may be used to generate the codebook 510. The number of the mask sequences to be used depends on particular applications.

The step S908 of the flowchart 900 may be executed in parallel with the step S906. The step S908 is aimed at generating the pre-defined type of the orthogonal set of vectors. In other words, each of the processor 502 and 702 is pre-aware of how the orthogonal set of vectors should look like, thereby proceeding to its generation in the same manner. In a preferred embodiment, the orthogonal set of vectors is configured as the generalized Hadamard matrix comprising elements that are defined by the prime factors constituting $N_{RE}$. In other words, each vector of the orthogonal set of vectors may be set to be respective one of the columns constituting such a generalized Hadamard matrix. In one embodiment, each column of the generalized Hadamard matrix can be found by computing the exponentiation of the q-th root of unity by a first-order polynomial with m variables.

The left branch of the flowchart 900 ends up with the step S910. In the step S910, the codebook 510 is generated by multiplying element-by-element the orthogonal set of vectors with the at least one generated mask sequence.

Let us give one example of how the codebook 510 may be constructed by using the flowchart 900. Assuming that n>1, i.e. $N_{RE}=p_1^{m_1}p_2^{m_2}\ldots p_n^{m_n}$, and only one mask sequence is required. Let us further consider one-to-one mapping from a set $\mathbb{Z}_{N_{RE}}$ of intergers modulo $N_{RE}$ to a cartesian product of the Galois fields with the orders of the prime factors from the prime factorization of $N_{RE}$:

$$\mathbb{Z}_{N_{RE}} \to GF(p_1^{m_1}) \times GF(p_2^{m_1}) \times \ldots \times GF(p_n^{m_n}).$$

Consistently, elements in $\mathbb{Z}_{N_{RE}}$ will be represented by m-dimensional vectors, which gives the m variables to be used in the quadratic polynomial. One example of such mapping is given below for $N_{RE}=12$, where each number $x \in \mathbb{Z}_{N_{RE}}$ can be represented by m=3 variables $[b_2, b_1, t]^T$, where $b_1$ and $b_2$ are two binary variables and t is a ternary variable, i.e. $x = t \times 2^0 \cdot 2^0 \cdot 3^0 + b_1 \times 2^0 \cdot 2^0 \cdot 3^1 + b_2 \times 2^0 \cdot 2^1 \cdot 3^1$. Explicitly, this mapping is given as follows:

$\mathbb{Z}_{12} \to GF(2^2) \times GF(3)$:

| |
|---|
| $0 \to (0, 0, 0)^T$ |
| $1 \to (0, 0, 1)^T$ |
| $2 \to (0, 0, 2)^T$ |
| $3 \to (0, 1, 0)^T$ |
| $4 \to (0, 1, 1)^T$ |
| $5 \to (0, 1, 2)^T$ |
| $6 \to (1, 0, 0)^T$ |
| $7 \to (1, 0, 1)^T$ |
| $8 \to (1, 0, 2)^T$ |
| $9 \to (1, 1, 0)^T$ |
| $10 \to (1, 1, 1)^T$ |
| $11 \to (1, 1, 2)^T$ |

According to the step S910 of the flowchart 900, each codeword $c_{S,k}$ of the codebook 510 should be defined as the element-wise product of the mask sequence and one of the orthogonal set of vectors. Let us also assume that the orthogonal set of vectors is configured as a unitary Hadamard matrix U. Then, $$c_{S,k} = \frac{1}{\sqrt{N_{RE}}} w_S \odot u_k$$

where $\odot$ is the sign of the elementwise product, also known as the Hadamard product, $u_k$ is the k-th column, $k \in \mathbb{Z}_{N_{RE}}$, of the matrix $$U = \frac{1}{\sqrt{N_{RE}}}[u_0, \ldots, u_{N_{RE}}],$$

which is generated in the step S908 of the flowchart 900, and $w_S$ is the mask sequence, which is generated in the step S906 of the flowchart 900.

Given that the mask sequence $w_S$ is obtained by using the quadratic form $Q(x_1, x_2, \ldots, x_m)$, which, in turn, is defined by the m×m symmetric matrix S, one may write the lth element, $l \in \mathbb{Z}_{N_{RE}}$, of the mask sequence $w_S$ as follows:

$$[w_S]_l = W^{l^T S l}.$$

By setting the base W to the q-root of unity, one may have $$[w_S]_l = \left(\sqrt[q]{1}\right)^{l^T S l} = e^{\frac{2\pi j}{q} l^T S l}.$$

As for the k-the column $u_k$ of the matrix U, its l-th element is given by $$[u_k]_l = e^{\frac{2\pi j}{q} k^T D l}$$

with m×m diagonal matrix D is given by $$D = blkdiag\left(\prod_{i\neq 1}p_i I_{p_1}, \prod_{i\neq 2}p_i I_{p_2}, \ldots, \prod_{i\neq n}p_i I_{p_n}\right) =$$
$$blkdiag\left(\frac{q}{p_1}I_{p_1}, \frac{q}{p_2}I_{p_2}, \ldots, \frac{q}{p_n}I_{p_n}\right)$$

where $I_n$ is the n×n identity matrix for any integer n, and $blkdiag(M_1, M_2, \ldots, M_n)$ is the block diagonal matrix with the matrices $M_1, M_2, \ldots, M_n$ along its diagonal. Thus, the elements of each codeword in the codebook 510 are defined by $$[c_{S,k}]_l = \frac{1}{\sqrt{N_{re}}}e^{\frac{2\pi j}{\Pi_i p_i}(l^T Sl + k^T Dl)}$$

where $l, k \in \mathbb{Z}_{N_{RE}}$, S is the m×m symmetric matrix, D is the m×m diagonal matrix as defined above. The advantage of such design of the codebook 510 is that it allows constructing the codebooks of any size.

Given below are different exemplary embodiments of how to construct the symmetric matrix S, which may be used by the processors 502 and 702 in the step S906 of the flowchart 900.

General Construction 1 (GC1)

Restricting the elements of the symmetric matrix S to integers modulo q enables the construction of the multidimensional codebooks in a controlled manner. Similar to the prior art, the elements in S related to the second-order terms in the binary field, i.e. the $m_1$ coefficients if $p_1=2$, must be divided by 2 to avoid ambiguity with the one-order terms already generated in the generalized Hadamard matrix. This is because $x^2=x$ only in the binary field. Hence, the elements of the codewords are not q-root of unity but 2q-root of unity.

Putting all together, the diagonal elements of S may be restricted to be integers modulo q, except for $p_1=2$ where $m_1$ corresponding diagonal elements of S are integers modulo p divided by 2. The off-diagonal elements of S are integers modulo q divided by 2—the division by two here is used to account that S is a symmetric matrix. As such, it is possible to construct a total $$N_{CB} = N_{RE}q^{\frac{m(m+1)}{2}}$$

codewords. This number is rather large, e.g. ≈10 and 19 bits with $N_{RE}=6$ and 12, respectively, for which the codebook 510 will inevitably have a small minimum distance $d_c$. It therefore is relevant to find smaller subcodebooks with larger possible minimum distances $d_c$. Finding such subcodebooks with the larger minimum distances $d_c$ is not a trivial problem. Several constructions that result in generating smaller codebooks with large minimum distances $d_c$ are described below.

General Construction 2 (GC2)

In this embodiment, the m×m symmetric matrix S is made of n blocks on its main diagonal, where the k-th block is of size $m_k \times m_k$ with integer elements modulo $p_k$ (and divided by two if $p_1=2$) times all other prime factors, or equivalently times q divided by $p_k$. In other words, the k-th block is constructed as $$\frac{q}{p_k}S_k = \prod_{i\neq k}p_i S_k,$$

where $S_k$ is $p_k$-ary symmetric matrix of size $m_k \times m_k$, and as $$\frac{q}{\lambda p_1}S_1$$

for $p_1=2$, where $$\lambda = \begin{cases} 2 \text{ if } p_1 = 2 \\ 1 \text{ otherwise} \end{cases}.$$

Such a choice of elements enables the construction of many codewords with not-too small minimum distances $d_c$. This construction may also be extended to the case $p_1=2$ and $m_1 > 1$, by considering all $S_1 \in \mathcal{S}_{m_1}^+$.

Block Diagonal (BD) Constructions

In this embodiment, the off-block-diagonal elements of the symmetric matrix S are set to zero such that $$S = blkdiag\left(\frac{1}{\lambda}\prod_{i\neq 1}p_i S_1, \prod_{i\neq 2}p_i S_2, \ldots, \prod_{i\neq n}p_i S_n\right) =$$
$$blkdiag\left(\frac{q}{\lambda p_1}S_1, \frac{q}{p_2}S_2, \ldots, \frac{q}{p_n}S_n\right),$$

where each $S_k$ is a $p_k$-ary symmetric matrix of size $m_k \times m_k$. In the case $p_1=2$, the first block $S_1$ may also be extended to $\mathcal{S}_{m_1}^+$ to have off-diagonal elements equal to 0, ½, 1 or 3/2.

By setting the off-block-diagonal elements to zero, the correlation between two codewords from two different symmetric matrices (used to define two different mask sequences), say, S as above and $$S' = blkdiag\left(\frac{q}{\lambda p_1}S'_1, \frac{q}{p_2}S'_2, \ldots, \frac{q}{p_n}S'_n\right),$$

is defined by $$|\theta(c_{S,k}, c_{S',k})| = \Pi_i p_i^{-R_i/2},$$

where $R_i = rank(S_i - S'_i)$. Let us remind that the corresponding chordal distance is given by $$d_c(c_{S,k}, c_{S',k}) = \sqrt{1 - |\theta(c_{S,k}, c_{S',k})|^2}.$$

Moreover, the codewords are the Kronecker products in the codewords in subdimensions $p_k^{m_k}$, which may be beneficial from implementation perspective. The maximum codebook size with the $p_k$-ary symmetric matrix $S_k$ is then $N_{CB} = \Pi_i p_i^{m_i(m_i+3)/2}$ with the maximum correlation $$\max_i\{p_i^{-1/2}\} = p_1^{-1/2}.$$

With such construction, the maximum minimum distance $d_c$ is therefore never less than $$\frac{1}{\sqrt{2}} \approx 0.71.$$

It desirable to construct even smaller subcodebook with the nested structure and largest possible distance $d_c$. To do this, the $S_k$ symmetric matrices should be selected carefully. Specific exemplary embodiments for $N_{RE}=q=p_1 p_2$ and $N_{RE}=2^{m_1}3$ are given below.

Block Diagonal Constructions for $N_{re}=p_1 p_2$

In this case, the number $N_{RE}$ of the REs is the product of two prime factors $p_1$ and $p_2$. Some relevant constructions with different sizes $N_{CB}$ and minimum distances $d_c=\sqrt{1-|\theta|^2}$ (which is expressed via the maximum correlation $\theta$ between the codewords) are summarized in Table 1. In this case, the $S_k$ symmetric matrices on the diagonal of the symmetric matrix S reduce to a scalar in the set $\mathbb{Z}_{p_k}$ of integers modulo $p_k$. In embodiment BD1, the same scalar is used in each diagonal element, this enable the achievement of the maximum possible rank difference between the matrices. In embodiment BD2, all values in $\mathbb{Z}_{p_2}$ for the second diagonal elements are considered such that they all have a rank one difference. In embodiment BD3, all possible values in both diagonal elements are considered such that they have least a rank one difference in one of the two elements.

TABLE 1

| Block diagonal constructions for $N_{RE}=p_1 p_2$ | | | |
|---|---|---|---|
| | S | $\max|\theta|^2$ | $N_{CB}$ |
| BD1 | $\left\{\begin{bmatrix} a\frac{p_2}{\lambda} & 0 \\ 0 & ap_1 \end{bmatrix}: a \in \mathbb{Z}_{p_1}\right\}$ | $(p_1 p_2)^{-1}$ | $p_1^2 p_2$ |
| BD2 | $\left\{\begin{bmatrix} a\frac{p_2}{\lambda} & 0 \\ 0 & ap_1 \end{bmatrix}, \begin{bmatrix} a_0\frac{p_2}{\lambda} & 0 \\ 0 & bp_1 \end{bmatrix}: a \in \mathbb{Z}_{p_1}, a_0 \text{ fixed}, b \in \mathbb{Z}_{p_2}\backslash \mathbb{Z}_{p_1}\right\}$ | $p_2^{-1}$ | $p_1 p_2^2$ |

TABLE 1-continued

| Block diagonal constructions for $N_{RE}=p_1 p_2$ | | | |
|---|---|---|---|
| | S | $\max|\theta|^2$ | $N_{CB}$ |
| BD3 | $\left\{\begin{bmatrix} a\frac{p_2}{\lambda} & 0 \\ 0 & bp_1 \end{bmatrix}: a \in \mathbb{Z}_{p_1}, b \in \mathbb{Z}_{p_2}\right\}$ | $p_1^{-1}$ | $p_1^2 p_2^2$ |

Block Diagonal Constructions for $N_{re}=2^{m_1}\cdot 3$

In the case, $N_{RE}=2^{m_1}\cdot 3$, the first block is a $m_1\times m_1$ matrix, while the second block is a scalar. Good codebooks are found by limiting the choice of the first block inside the corresponding Kerdock set or cosets of the Kerdock set. These constructions are summarized in Table 2 provided with their sizes $N_{CB}$ and minimum chordal distances $d_c$.

In embodiment BD4, the symmetric matric S is made of two diagonal blocks. The first block is a $m_1\times m_1$ binary matrix from the Kerdock set $K_{m_1}=DG(m_1, 0)$. The second block is a ternary number uniquely associated to the first block such each block is used only once.

In embodiment BD5, the first block is any binary matrix from the Kerdock set $K_{m_1}=DG(m_1, 0)$, while the second block is a fixed ternary value, for example, 0.

The embodiment BD6 is specific to $N_{RE}=12$. In this case, the first block is any binary matrix from the Kerdock set $K_2=DG(2,0)$ or in a coset of this Kerdock set, where one coset leader is taken from the next DG set $\mathcal{S}_2=DG(2,1)$ and another coset leader is taken from the symmetric matrix in the extension $\mathcal{S}_2^+$ not in $\mathcal{S}_2$. Here, DG(2,1) contains only one coset of the Kerdock set so that a second coset can only be found in the extension $\mathcal{S}_2^+$. The second block is a ternary number uniquely associated to the coset leader in the first block.

In embodiment BD7, the first block is any binary matrix from the Kerdock set $K_{m_1}=DG(m_1,0)$ or in a coset of this Kerdock set, where a coset leader is taken from the next DG set $DG(m_1,1)$. The second block is a ternary number uniquely associated to the coset leader in the first block.

The embodiment BD8 is the largest of such type of construction as described above, and embodiment BD9 is its extension to $\mathcal{S}_{m_1}^+$.

TABLE 2

| Block diagonal constructions for $N_{RE}=2^{m_i}\cdot 3$ | | | |
|---|---|---|---|
| | S | $\max|\theta|^2$ | $N_{CB}$ |
| BD4 | $\left\{\begin{bmatrix} \frac{3}{2}A_i & 0 \\ 0 & 2b_i \end{bmatrix}: A_i \in DG(m_1, 0) \text{ uniquely associated to a } b_i \in \mathbb{Z}_3\right\}$ | $2^{-m_1}\cdot 3^{-1}$ | $2^{m_1}\cdot 3^2$ |
| BD5 | $\left\{\begin{bmatrix} \frac{3}{2}A & 0 \\ 0 & 2b_0 \end{bmatrix}: A \in DG(m_1, 0), b_0 \text{ fixed}\right\}$ | $2^{-m_1}$ | $2^{2m_1}\cdot 3$ |
| BD6 | $m_1 = 2$ $\left\{\begin{bmatrix} \frac{3}{2}A & 0 \\ 0 & 2b_i \end{bmatrix}: A \in \{A_i + DG(2, 0)\} \text{ where } A_0 = 0, A_1 \in DG(2, 1), A_2 \in \mathcal{S}_2^+ \backslash \mathcal{S}_2, \text{ and } b_i \in \mathbb{Z}_3\right\}$ | $2^{-2}$ | $2^4\cdot 3^2$ |

TABLE 2-continued

Block diagonal constructions for $N_{RE} = 2^{m_i} \cdot 3$

| | S | $\max|\theta|^2$ | $N_{CB}$ |
|---|---|---|---|
| BD7 | For $m_1 \geq 3$ $$\left\{\begin{bmatrix} \frac{3}{2}A & 0 \\ 0 & 2b_i \end{bmatrix}: A \in \{A_i + DG(m_1, 0)\} \text{ where } A_0 = 0, \right. \\ \left. A_1, A_2 \in DG(m_1, 1), \text{ and } b_i \in \mathbb{Z}_3 \right\}$$ | $2^{-(m_1-2)} \cdot 3^{-1}$ | $2^{2m_1} \cdot 3^2$ |
| BD8 | $\left\{\begin{bmatrix} \frac{3}{2}A & 0 \\ 0 & 2b \end{bmatrix}: A \in \mathcal{S}_{m_1}, b \in \mathbb{Z}_3\right\}$ | $2^{-1}$ | $2^{\frac{m_1(m_1+3)}{2}} \cdot 3^2$ |
| BD9 | $\left\{\begin{bmatrix} \frac{3}{2}A & 0 \\ 0 & 2b \end{bmatrix}: A \in \mathcal{S}_{m_1}^+, b \in \mathbb{Z}_3\right\}$ | $\frac{5}{8}$ | $2^{m_1(m_1+1)} \cdot 3^2$ |

Extended BD (EBD) Constructions

The smallest BD constructions above lead to good codebooks, notably for the smallest size cases. The following embodiments show that it is possible to subsequently enlarge some of these previous constructions without significantly affecting the minimum distance $d_c$ by considering some specific non-zero diagonal elements.

A good choice for the off-diagonal elements of symmetric matric S is to limit them to multiples of the first prime factor as $(r \cdot c \cdot p_1/2)$, where $c \in \mathbb{Z}_{q/p_1}$ and r can be any integer such that $(r \bmod q/p_1) \neq 0$. Without loss of generality, one may select $r=2$ such that the off-diagonal elements are any integer multiples of $c \cdot p_1$, where the multiple c is an interger modulo the product of all prime factors. Similarly, the k-th good choice for the off-diagonal elements are $(c \cdot p_k)$, where $c \in \mathbb{Z}_{q/p_k}$.

Two embodiments of such constructions for $N_{RE} = p_1 p_2$ are given in Table 3. Embodiment EBD1 extends embodiment BD2. Embodiment EBD2 extends embodiment BD3.

TABLE 3

Extended block diagonal constructions for $N_{RE} = p_1 p_2$

| | S | $\max|\theta|2$ | $N_{CB}$ |
|---|---|---|---|
| EBD1 | $\left\{\begin{bmatrix} a\frac{p_2}{\lambda} & cp_1 \\ cp_1 & ap_1 \end{bmatrix}, \begin{bmatrix} a_0\frac{p_2}{\lambda} & cp_1 \\ cp_1 & bp_1 \end{bmatrix}: a \in \mathbb{Z}_{p_1}, a_0 \text{ fixed}, \right. \\ \left. b \in \mathbb{Z}_{p_2} \backslash \mathbb{Z}_{p_1}, c \in \mathbb{Z}_{p_2} \right\}$ | $\begin{cases} p_1^{-2} & \text{if } p_1 = 2, p_2 > 3 \\ p_2^{-1} & \text{otherwise} \end{cases}$ | $p_1 p_2^3$ |
| EBD2 | $\left\{\begin{bmatrix} a\frac{p_2}{\lambda} & cp_1 \\ cp_1 & ap_1 \end{bmatrix}: a \in \mathbb{Z}_{p_1}, b, c \in \mathbb{Z}_{p_2}\right\}$ | $p_1^{-1}$ | $p_1^2 p_2^3$ |

Other embodiments of such constructions for $N_{RE}=12=2^2 \times 3$ and $N_{RE}=24=2 \times 3$ are given in Table 4 and Table 5, respectively. Embodiments EBD4 and EBD9 are counterpart constructions in their respective dimension, based on Kerdock set matrices in the first diagonal block. Embodiments EBD6 and EBD11 are also counterpart constructions, based on all possible symmetric matrices in the first diagonal block. Embodiment EBD10 only selects 3 cosets of the Kerdock set for the first block, which are uniquely associated with a value in the second diagonal block.

TABLE 4

Extended block diagonal constructions for $N_{RE} = 12$

| | S | $\max|\theta|^2$ | $N_{CB}$ |
|---|---|---|---|
| EBD4 | $\left\{ \begin{bmatrix} \frac{3}{2}A & 2c \\ 2c^T & 2b_0 \end{bmatrix} : A \in DG(2, 0), c \in Z_3 \times Z_3, b_0 \text{ fixed} \right\}$ | $2^{-2}$ | $2^4 \cdot 3^3$ |

TABLE 4-continued

Extended block diagonal constructions for $N_{RE} = 12$

| | S | $\max|\theta|^2$ | $N_{CB}$ |
|---|---|---|---|
| EBD5 | $\left\{ \begin{bmatrix} \frac{3}{2}A & 2c \\ 2c^T & 2b \end{bmatrix} : A \in DG(2, 0), c \in Z_3 \times Z_3, b \in Z_3 \right\}$ | $3^{-1}$ | $2^4 \cdot 3^4$ |
| EBD6 | $\left\{ \begin{bmatrix} \frac{3}{2}A & 2c \\ 2c^T & 2b \end{bmatrix} : A \in \mathcal{S}_2, c \in Z_3 \times Z_3, b \in Z_3 \right\}$ | $2^{-1}$ | $2^5 \cdot 3^4$ |
| EBD7 | $\left\{ \begin{bmatrix} \frac{3}{2}A & 2c \\ 2c^T & 2b \end{bmatrix} : A \in \mathcal{S}_2^+, c \in Z_3 \times Z_3, b \in Z_3 \right\}$ | $\frac{5}{8}$ | $2^6 \cdot 3^4$ |

TABLE 5

Extended block diagonal constructions for $N_{RE} = 24$

| | S | $\max|\theta|^2$ | $N_{CB}$ |
|---|---|---|---|
| EBD8 | $\left\{ \begin{bmatrix} \frac{3}{2}A & 2c1_{3\times 1} \\ 2c1_{1\times 3} & 2b_0 \end{bmatrix} : A \in DG(3, 0), c \in Z_3, b_0 \text{ fixed} \right\}$ | $2^{-6}3^2$ | $2^6 \cdot 3^2$ |
| EBD9 | $\left\{ \begin{bmatrix} \frac{3}{2}A & 2c \\ 2c^T & 2b_0 \end{bmatrix} : A \in DG(3, 0), c \in Z_3^3, b_0 \text{ fixed} \right\}$ | $2^{-2}$ | $2^6 \cdot 3^4$ |
| EBD10 | $\left\{ \begin{bmatrix} \frac{3}{2}A & 2c \\ 2c & 2b_i \end{bmatrix} : A \in \{A_i + DG(3, 0)\} \text{ where } A_0 = 0, \right.$ $\left. A_1, A_2 \in DG(3, 1), b_i \in \mathbb{Z}_3, \text{ and } c \in Z_3^3 \right\}$ | ≈0.311 | $2^6 \cdot 3^5$ |
| EBD11 | $\left\{ \begin{bmatrix} \frac{3}{2}A & 2c \\ 2c^T & 2b \end{bmatrix} : A \in \mathcal{S}_3, c \in Z_3^3, b \in Z_3 \right\}$ | $2^{-1}$ | $2^9 \cdot 3^5$ |

FIGS. 10-14 show the minimum chordal distance $d_c$ as a function of the codebook size for different $N_{RE}$=6, 12, 14, 15, and 24. All the codebooks obtained are compared to a composite bound (shown as a solid line in FIGS. 10-14) made of the simplex/Welch, Levenshtein, and Hamming bounds. None of these bounds are met and the gap increases as the codebook size increases. This is expected because these bounds are known to become loose for the large codebook size. For $N_{RE}$=6, 12, 14, 15, and 24 (see FIGS. 10-14, respectively), the codebooks 510 constructed by using the above-described different embodiments of S are compared to single-variate quadratic polynomial phase ZC sequences.

For $N_{RE}$=12, the codebooks 510 are also compared to the computer search over a Quadrature Phase Shift Keying (QPSK) alphabet, such that the codebooks are also collections of unitary bases nested in size. The computer-search codebooks larger than ii bits are not available due to search complexity.

For $N_{RE}$=14 and 15 (see FIGS. 12 and 13), the prior art nested codebook family [0127][0127][0127] with a Phase-Shift Keying (PSK) alphabet for the non-prime dimension of the form $2(2^r-1)$ and $(2^r-1)$ is also displayed. The construction of this prior art nested codebook family can be found in the following documents: 1) S. Boztas, R. Hammons and P. Y. Kumar, "4-phase sequences with near-optimum correlation properties," IEEE TIT 1992; 2) P. Y. Kumar, T. Helleseth, A. R. Calderbank, and R. Hammons "Large Families of Quaternary Sequences with Low Correlation," IEEE TIT 1996; 3) P. Y. Kumar, T. Helleseth, A. R. Calderbank, "An Upper Bound for Weil Exponential Sums over Galois Rings and Applications," IEEE TIT 1995.

Thus, the above-described construction of the codebook 510 by using different S, in general, shows the highest minimum chordal distance $d_c$ and/or the largest codebook size. Nevertheless, it should be noted that, ultimately, more general computer search without any restriction on the codebook design should provide better codebooks at least for some small enough codebook sizes and not too large $N_{RE}$, where the search complexity is manageable. Some exotic analytical constructions in the prior art may also be better for some given $N_{RE}$ and codebook sizes. However, there is no construction in the prior art which would generate families of codebooks that outperforms the codebook 510 constructed as describe above for any codebook size and $N_{RE}$.

Figure 15:
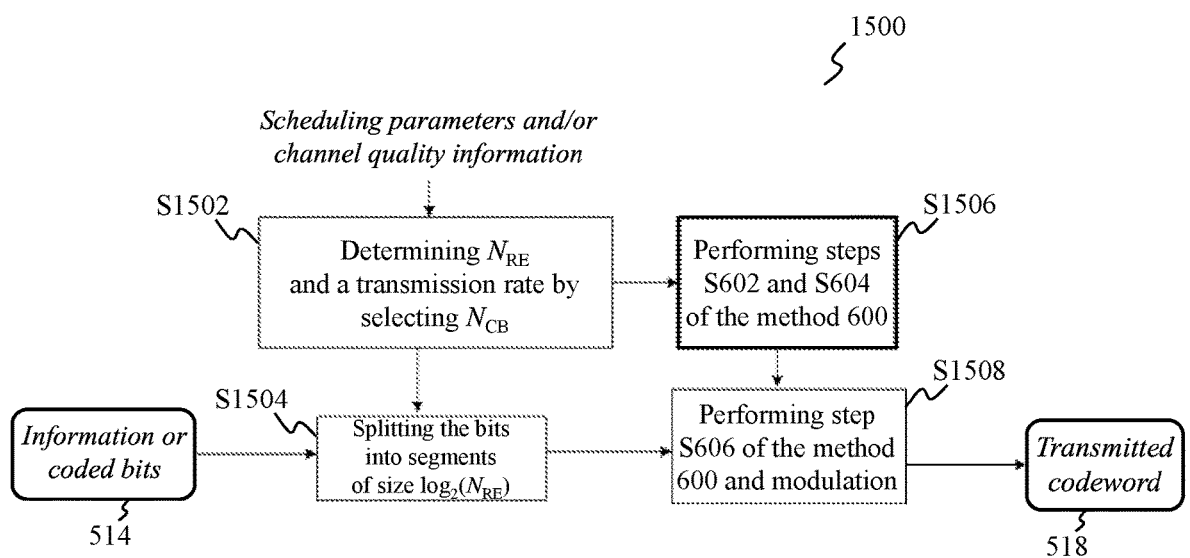
FIG. 15 shows a method of operating the transmitter shown in FIG. 5 in accordance with one other example.

FIG. 15 shows a method 1500 of operating the transmitter 500 in accordance with one other exemplary embodiment. In general, the method 1500 may be considered as an extension of the method 600, since it involves the steps S602-S606. In particular, the method 1500 starts with a step S1502, in which the processor 502 of the transmitter 500 determines the number $N_{RE}$ of the REs available for the pilotless transmission, and a transmission rate by selecting the proper size $N_{CB}$ of the codebook 510 to be generated. The values $N_{RE}$ and $N_{CB}$ may be derived from scheduling parameters and/or channel quality information provided to the transmitter 500 from, for example, the receiver 700 or any other network device configured to estimate the quality of communications via the communication channel used by the transmitter 500 and the receiver 700 for their interaction.

Next, the method 1500 proceeds to steps S1504 and S1506, which may be performed by the processor 502 in parallel. In the step S1504, the processor 502 receives the information bits 514 and split them into the same segments, for example, into segments each of size $\log_2(N_{RE})$. In the step S1506, the processor 502 performs the steps S602 and S604 of the method 600, thereby generating the codebook 510. After that, the method 1500 proceeds to a step S1508, in which the processor 502 maps each of the segments to respective one of the codewords constituting the codebook 510, whereupon modulates the subcarrier(s) provided by the $N_{RE}$ REs with the codeword(s) 518 thus selected for their transmission to the receiver 700.

Figure 16:
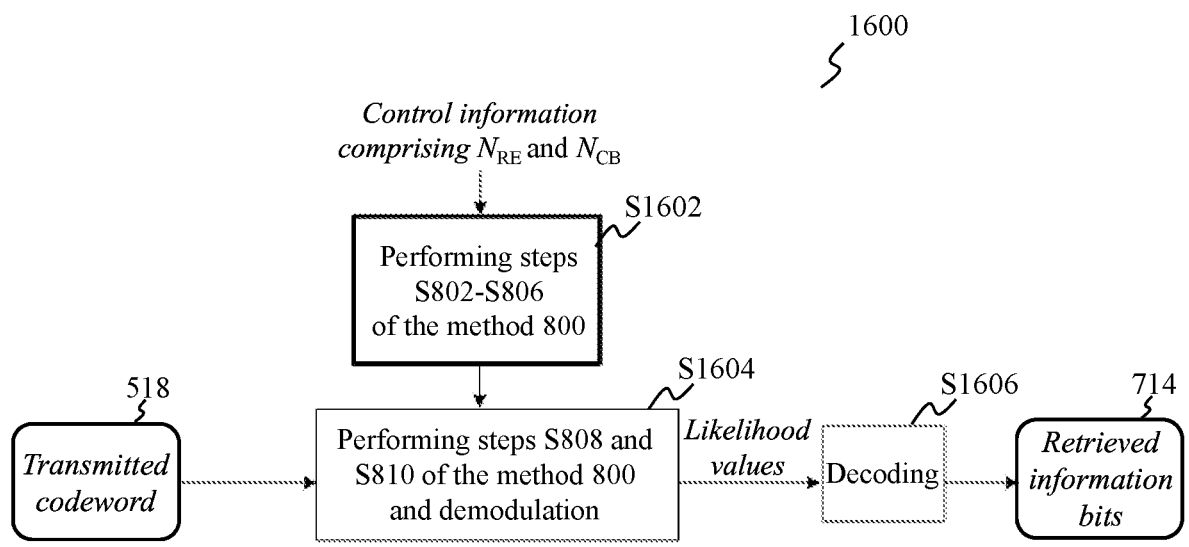
FIG. 16 shows a method of operating the receiver shown in FIG. 7 in accordance with one other example.

FIG. 16 shows a method 1600 of operating the receiver 700 in accordance with one other exemplary embodiment. Similarly, the method 1600 may be considered as an extension of the method 800, since it involves the steps S802-S810. In particular, the method 1600 starts with a step S1602, in which the processor 702 of the receiver 700 performs the steps S802-S806 of the method 800, thereby generating the same codebook 510 as the processor 502 of the transmitter 500. To do this, the processor 702 needs to know at least the values $N_{RE}$ and $N_{CB}$; other parameters that may be required for generating the codebook 510, such as the type of the orthogonal set of vectors and the base W used in the exponentiation operation, may be pre-stored in the storage 704 of the receiver 700.

Next, the method 1600 proceeds to step S1604, in which the processor 702 performs the steps S808 and S810 of the method 800, concurrently demodulating the modulated subcarrier(s). For example, the step S1604 may yield likelihood values rather than the information bits. The likelihood values may then be used in a step S1606 for decoding the transmitted codeword(s) 518, thereby yielding the retrieved information bits 714.

Figure 17:
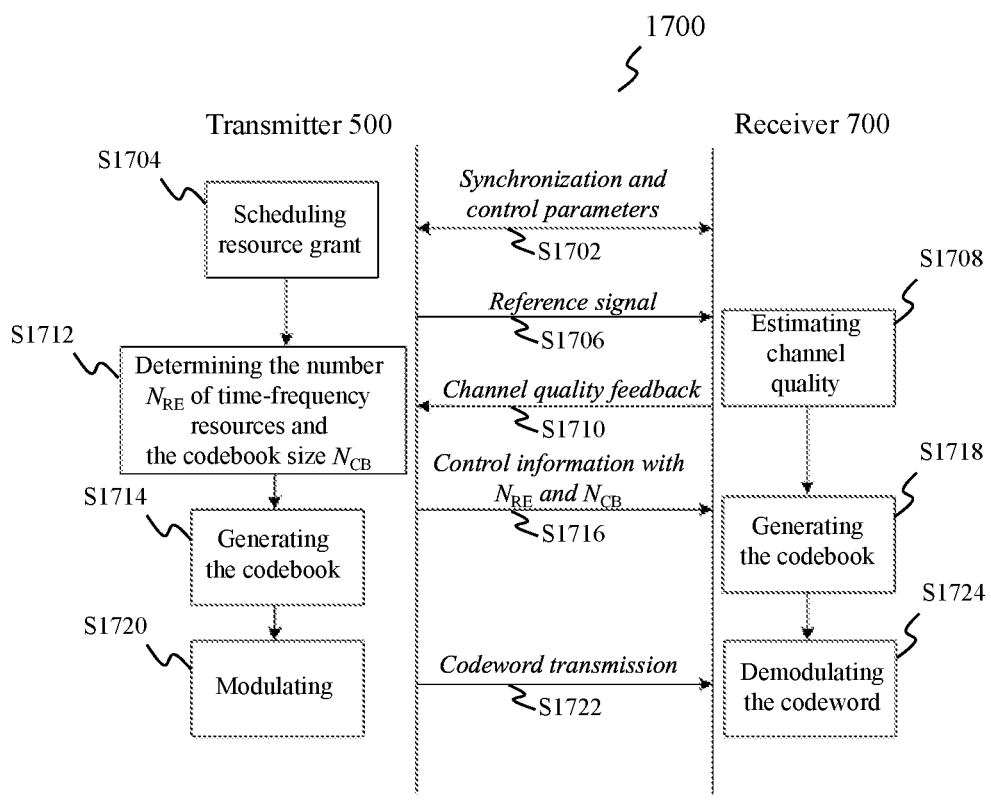
FIG. 17 shows a flow diagram explaining the interaction between the transmitter shown in FIG. 5 and the receiver shown in FIG. 7 in accordance with one example.

FIG. 17 shows a flow diagram 1700 showing the interaction between the transmitter 500 and the receiver 700 in accordance with one exemplary embodiment. It is assumed that the transmitter 500 is part of the BS, while the receiver 700 is part of the UE. The flow diagram 1700 starts with a step S1702, in which the transmitter 500 of the BS and receiver 700 of the UE communicate different synchronization signals and control parameters to each other; such synchronization signals and control parameters may be used to properly establish the communication channel therebetween. During this process, the transmitter 500 of the BS also prepares a resource grant for the receiver 700 of the UE in a step S1704, and sends the resource grant to the receiver 700 of the UE via the control parameters in S1702. Further, in a step S1704, the transmitter 500 sends a reference signal in a step S1706, such as a Channel State Information Reference Signal (CSI-RS) or Cell-specific Reference Signal (C-RS). The receiver 700 receives the reference signal and starts estimating channel quality in a step S1708, whereupon the receiver 700 sends channel quality feedback to the transmitter 500 in a step S1710. The transmitter 500 receives the channel quality feedback and, based thereon, determines the number $N_{RE}$ of the REs to be allocated and the size $N_{CB}$ of the codebook 510 to be generated in a step S1712 which corresponds to the rate of the transmission the communication channel can support according to the channel quality feedback. Once $N_{RE}$ and $N_{CB}$ are determined, the transmitter 500 generates, in a step S1714, the codebook 510 by using the method 600. Parallel to and after the step S1714, the transmitter 500 sends the control information 710 comprising $N_{RE}$ and $N_{CB}$ to the receiver 700 in a step S1716. The receiver 700 receives the control information 710 and use it to generate the same codebook 510 in a step S1718 by using the method 800. After the step S1718, the preconfiguration of the receiver 700 is finished, i.e. the receiver 700 is ready for the pilotless transmission from the transmitter 500.

When the transmitter 500 has the information bits 514 to be transmitted, it maps them to at least one codeword of the codebook 510 and modulates at least one subcarrier provided by the $N_{RE}$ REs with the at least one codeword in a step S1720. In other words, the step S1720 yields the at least one transmitted codeword 518, which is then transmitted by the transmitter 500 to the receiver 700 in a step S1722. The step S1720 is performed without any pilot, such as the DM-RS, that would enable equalization at the receiver 700. The receiver 700, in turn, receives the at least one transmitted codeword 518, demodulates it and obtain the retrieved information bits 710 therefrom in a step S1724. After that, the flowchart 1700 ends up.

It should be noted that each step or operation of the methods 600, 800, 1500, 1600, the flowchart 900 and the flow diagram 1700, or any combinations of the steps or operations, can be implemented by various means, such as hardware, firmware, and/or software. As an example, one or more of the steps or operations described above can be embodied by processor executable instructions, data structures, program modules, and other suitable data representations. Furthermore, the processor-executable instructions which embody the steps or operations described above can be stored on a corresponding data carrier and executed by the processors 502 and 702. This data carrier can be implemented as any computer-readable storage medium configured to be readable by said at least one processor to execute the processor executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

Although the exemplary embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or operations, and the indefinite article "a" or "an" does not exclude a plurality. The mere fact that certain measures are recited in mutually different dependent claims does not indicate that a combination of these measures cannot be used to advantage.

What is claimed is:

1. A transmitter for wireless communications, comprising:
at least one processor; and
a non-transitory computer readable medium storing a program for execution by the at least one processor, the program including instructions to:
    obtain, using prime factorization, prime factors for a number $N_{RE}$ of time-frequency resources, including at least two numerically unique prime factors which do not repeat each other;
    generate a codebook comprising at least one codeword, wherein each codeword of the at least one codeword is generated by multiplying at least one mask sequence with one vector of an orthogonal set of vectors, and wherein each mask sequence of the at least one mask sequence is obtained from an exponentiation operation involving a base and an exponent, the base being defined by the at least two numerically unique prime factors and the exponent being defined by a quadratic polynomial having a number m of variables, where m is equal to a total number of prime factors constituting $N_{RE}$; and
    provide, to a receiver, information bits in at least one codeword of the at least one codeword over the $N_{RE}$ time-frequency resources,
wherein the base is defined as a q-th root unity, where q is a product of the at least two numerically unique prime factors, and wherein the quadratic polynomial is a quadratic form defined by using an m×m symmetric matrix S.

2. The transmitter of claim 1, wherein the orthogonal set of vectors is configured as a generalized Hadamard matrix comprising elements that are defined by the prime factors constituting $N_{RE}$.

3. The transmitter of claim 1, wherein the symmetric matrix S comprises diagonal elements represented by integers modulo q or integers modulo q divided by 2, and further comprises off-diagonal elements represented by integers modulo q divided by 2.

4. The transmitter of claim 1, wherein the symmetric matrix S comprises a main diagonal constituted by blocks;
wherein each block of the blocks has a size corresponding to an order of a respective first prime factor of the prime factors constituting $N_{RE}$, and comprises elements each being at least one of a product of an integer modulo the first prime factor and q divided by said prime factor where the first prime factor is odd, or a product of an integer modulo the first prime factor and q divided by the product of 2 and the first prime factor where said prime factor is two; and
wherein the symmetric matrix S comprises off-diagonal-block elements set to at least one of zero or to integer multiples of one of the prime factors constituting $N_{RE}$.

5. The transmitter of claim 1, wherein the symmetric matrix S comprises a main diagonal having a first block and a second block, wherein the first block comprises a binary matrix selected from a Delsarte-Goethals (DG) set of binary matrices, and wherein the second block comprises a ternary number that is fixed or associated with the first block.

6. The transmitter of claim 1, wherein the program further includes instructions to:
generate control information comprising the number $N_{RE}$ of the time-frequency resources and a number $N_{CB}$ of the codewords in the generated codebook; and
provide, to the receiver, the control information prior to providing the information bits.

7. A receiver for wireless communications, comprising:
at least one processor; and
a non-transitory computer readable medium storing a program for execution by the at least one processor, the program including instructions to:
    receive control information comprising a number $N_{RE}$ of time-frequency resources and a number $N_{CB}$ of codewords to be in a codebook to be generated;
    find, using prime factorization, prime factors for $N_{RE}$, including at least two numerically unique prime factors which do not repeat each other;
    generate the codebook comprising the $N_{CB}$ codewords, wherein each codeword of the $N_{CB}$ codewords is generated by multiplying at least one mask sequence with one vector of an orthogonal set of vectors, and wherein each mask sequence of the at least one mask sequence is obtained from an exponentiation operation involving a base and an exponent, the base being defined by the at least two numerically unique prime factors, and the exponent being defined by a quadratic polynomial having a number m of variables, where m is equal to a total number of the prime factors constituting $N_{RE}$;

receive at least one transmitted codeword having information bits encoded therein; and retrieve the information bits by calculating chordal distances between the at least one transmitted codeword and each of the $N_{CB}$ codewords, wherein the base is defined as a q-th root unity, where q is a product of the at least two numerically unique prime factors, and wherein the quadratic polynomial is a quadratic form defined by using an m×m symmetric matrix S.

8. The receiver of claim 7, wherein the orthogonal set of vectors is configured as a generalized Hadamard matrix comprising elements that are defined by the prime factors constituting $N_{RE}$.

9. The receiver of claim 7, wherein the symmetric matrix S comprises diagonal elements represented by integers modulo q or integers modulo q divided by 2, and off-diagonal elements represented by integers modulo q divided by 2.

10. The receiver of claim 7, wherein the symmetric matrix S comprises a main diagonal constituted by blocks;

wherein each block of the blocks has a size corresponding to an order of a respective first prime factor of the prime factors constituting $N_{RE}$, and comprises elements each being at least one of a product of an integer modulo the first prime factor and q divided by said prime factor where the first prime factor is odd, or a product of an integer modulo the first prime factor and q divided by the product of 2 and the first prime factor where said prime factor is two; and wherein the symmetric matrix S comprises off-diagonal-block elements set to at least one of zero or to integer multiples of one of the prime factors constituting $N_{RE}$.

11. The receiver of claim 7, wherein the symmetric matrix S comprises a main diagonal having a first block and a second block, wherein the first block comprises a binary matrix selected from a Delsarte-Goethals (DG) set of binary matrices, and wherein the second block comprises a ternary number that is one of fixed or associated with the first block.

12. A method for wireless communication, comprising:

finding, using prime factorization, prime factors for a number $N_{RE}$ of time-frequency resources, including at least two numerically unique prime factors which do not repeat each other;

generating a codebook comprising at least one codeword, each of the at least one codeword being generated by multiplying at least one mask sequence with one vector of an orthogonal set of vectors, and each mask sequence of the at least one mask sequence being obtained from an exponentiation operation involving a base and an exponent, the base being defined by the at least two numerically unique prime factors, and the exponent being defined by a quadratic polynomial having a number of m variables, where m is equal to a total number of the prime factors constituting $N_{RE}$; and providing, to a receiver, information bits in at least one of the at least one codeword over the $N_{RE}$ of time-frequency resources, wherein the base is defined as a q-th root unity, where q is a product of the at least two numerically unique prime factors, and wherein the quadratic polynomial is a quadratic form defined by using an m×m symmetric matrix S.

13. The method of claim 12, wherein the symmetric matrix S comprises diagonal elements represented by integers modulo q or integers modulo q divided by 2, and further comprises off-diagonal elements represented by integers modulo q divided by 2.

14. The method of claim 12, wherein the symmetric matrix S comprises a main diagonal constituted by blocks;

wherein each block of the blocks has a size corresponding to an order of a respective first prime factor of the prime factors constituting $N_{RE}$, and comprises elements each being at least one of a product of an integer modulo the first prime factor and q divided by said prime factor where the first prime factor is odd, or a product of an integer modulo the first prime factor and q divided by the product of 2 and the first prime factor where said prime factor is two; and wherein the symmetric matrix S comprises off-diagonal-block elements set to at least one of zero or to integer multiples of one of the prime factors constituting $N_{RE}$.

15. A method for wireless communication, comprising:

receiving control information comprising a number $N_{RE}$ of time-frequency resources and a number $N_{CB}$ of codewords to be in a codebook to be generated;

finding, using prime factorization, prime factors for $N_{RE}$, at least two of the prime factors being numerically unique and which do not repeat each other;

generating the codebook comprising $N_{CB}$ codewords, each codeword of the $N_{CB}$ codewords being generated by multiplying at least one mask sequence with one vector of an orthogonal set of vectors, and each of the at least one mask sequence being obtained from an exponentiation operation involving a base and an exponent, the base being defined by the at least two numerically unique prime factors, and the exponent being defined by a quadratic polynomial having a number m of variables, where m is equal to a total number of the prime factors constituting $N_{RE}$;

receiving at least one transmitted codeword having information bits encoded therein; and retrieving the information bits by calculating chordal distances between the at least one transmitted codeword and each of the $N_{CB}$ codewords, wherein the base is defined as a q-th root unity, where q is a product of the at least two numerically unique prime factors, and wherein the quadratic polynomial is a quadratic form defined by using an m×m symmetric matrix S.

16. The method of claim 15, wherein the symmetric matrix S comprises diagonal elements represented by integers modulo q or integers modulo q divided by 2, and further comprises off-diagonal elements represented by integers modulo q divided by 2.

* * * * *